United States Patent
Hui et al.

(10) Patent No.: US 9,992,687 B2
(45) Date of Patent: Jun. 5, 2018

(54) EFFICIENT BEAM SCANNING FOR HIGH-FREQUENCY WIRELESS NETWORKS

(71) Applicant: Telefonaktiebolaget L M Ericsson (publ), Stockholm (SE)

(72) Inventors: Dennis Hui, Sunnyvale, CA (US); Johan Axnäs, Solna (SE); Robert Baldemair, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 762 days.

(21) Appl. No.: 14/531,494

(22) Filed: Nov. 3, 2014

(65) Prior Publication Data
US 2016/0127919 A1    May 5, 2016

(51) Int. Cl.
*H04W 4/00* (2018.01)
*H04W 16/28* (2009.01)
*H04B 7/06* (2006.01)

(52) U.S. Cl.
CPC .......... *H04W 16/28* (2013.01); *H04B 7/0617* (2013.01); *H04B 7/0639* (2013.01)

(58) Field of Classification Search
CPC .................................................. H04W 16/28
USPC ..................................................... 455/422.1
See application file for complete search history.

(56) References Cited

U.S. PATENT DOCUMENTS

| | | |
|---|---|---|
| 2009/0189812 A1 | 7/2009 | Xia et al. |
| 2013/0051302 A1 | 2/2013 | Kim |
| 2014/0073329 A1 | 3/2014 | Kang et al. |

FOREIGN PATENT DOCUMENTS

| | | |
|---|---|---|
| RU | 2406263 C2 | 12/2010 |
| WO | 2013028013 A2 | 2/2013 |

OTHER PUBLICATIONS

International Search Report and Written Opinion for International Patent Application No. PCT/IB2015/058499, dated Feb. 24, 2016, 13 pages.

(Continued)

*Primary Examiner* — Joel Ajayi
(74) *Attorney, Agent, or Firm* — Withrow & Terranova, PLLC

(57) ABSTRACT

Systems and methods relating to non-adaptive beam scanning in a wireless network are disclosed. In some embodiments, a method of operation of a transmit node to perform non-adaptive beam scanning for transmit beam patterns of the transmit node that partition a service coverage area of the transmit node into transmit partition cells is provided. The method transmitting a known signal using each of multiple scanning beam patterns for each of multiple beam scanning stages over non-overlapping radio resource slots. The scanning beam patterns for the beam scanning stages are such that each unique combination of scanning beam patterns consisting of one scanning beam pattern from each of the beam scanning stages corresponds to a different transmit beam pattern of the transmit node. This multi-stage beam scanning approach provides an exponentially more efficient process for beam scanning than the conventional Sequential Beam Sweeping (SBS) approach.

27 Claims, 24 Drawing Sheets

(56) References Cited

OTHER PUBLICATIONS

Hur, Sooyoung et al., "Multilevel Millimeter Wave Beamforming for Wireless Backhaul," 2011 GLOBECOM Workshops, Dec. 5-9, 2011, Houston, Tx, IEEE, pp. 253-257

Zhou, Liang et al., "Efficient Codebook Based MIMO Beamforming for Millimeter-Wave WLANs ," 2012 IEEE 23rd International Symposium on Personal Indoor and Mobile Radio Communications (PIMRC), Sep. 9-12, 2012, Sydney, NSW, IEEE, pp. 1885-1889.

STAGE 1, PATTERN 1

STAGE 1, PATTERN 2

STAGE 2, PATTERN 1

STAGE 3, PATTERN 1

STAGE 3, PATTERN 2

EFFICIENT BEAM SCANNING FOR HIGH-FREQUENCY WIRELESS NETWORKS

FIELD OF THE DISCLOSURE

The present disclosure relates to beam scanning in a wireless network.

BACKGROUND

The explosive rise in popularity of smart phones has drastically increased the demand for ubiquitous mobile data services. To cope with the exponential growth in mobile data traffic, it is anticipated that new radio spectra with substantially larger bandwidths than those available today for mobile communications will be needed in the future. As a result, technologies that enable wireless communications over high-frequency bands (e.g., millimeter wave (mmW) bands) where large amounts of under-utilized spectrum are available have recently received much attention.

Communicating wirelessly over high frequency bands, such as the mmW bands, are not without challenges. Radio signals transmitted over such bands typically suffer from higher path loss than those transmitted over the lower frequency bands that are currently used in cellular communications. The problem is further exacerbated in the unlicensed 60 Gigahertz (GHz) band where radio signals suffer additional losses due to oxygen and rain absorption.

In order to overcome the resulting tight link budget, wireless communications over high frequency bands have to rely on a large directional gain achieved by forming narrow beams of radio signals using, for example, an adaptively steerable antenna array. Fortunately, the shortened wavelengths in high frequency bands make it possible for a device, such as an Access Node (AN) or User Equipment (UE), of reasonable size to be equipped with a relatively large number of antennas for narrow beamforming. A large number of antennas provide a communication device with access to high spatial resolution. However, high spatial resolution also induces high spatial uncertainty. Due to the high spatial selectivity resulting from narrow beamforming, a slight error in the choice of beam direction can lead to drastic decrease in Signal-to-Noise Ratio (SNR). As such, there is a need for an effective beam finding procedure in order for a wireless communication device (e.g., an AN or a UE) to identify the proper beam direction to communicate with its partner.

SUMMARY

Systems and methods relating to non-adaptive beam scanning in a wireless network are disclosed. In some embodiments, a method of operation of a transmit node to perform non-adaptive beam scanning for transmit beam patterns of the transmit node that partition a service coverage area of the transmit node into transmit partition cells is provided. The method of operation of the transmit node comprises transmitting a known signal using each of multiple scanning beam patterns for each of multiple beam scanning stages over non-overlapping radio resource slots. The scanning beam patterns for the beam scanning stages are such that each unique combination of scanning beam patterns consisting of one scanning beam pattern from each of the beam scanning stages corresponds to a different transmit beam pattern of the transmit node. This multi-stage beam scanning approach provides an exponentially more efficient process for beam scanning than the conventional Sequential Beam Sweeping (SBS) approach.

In some embodiments, for each beam scanning stage, the scanning beam patterns for the beam scanning stage partition the service coverage area of the transmit node into a set of scanning partition cells for the beam scanning stage such that each pair of scanning partition cells in the set of scanning partition cells for the beam scanning stage are disjoint and the union of the scanning partition cells in the set of scanning partition cells for the beam scanning stage covers the entire service coverage area of the transmit node. The scanning beam patterns for the beam scanning stages are such that, for each unique combination of scanning partition cells consisting of one scanning partition cell from each of the beam scanning stages, an intersection of the unique combination of scanning partition cells corresponds to a different one of the transmit partition cells of the service coverage area of the transmit node and thus a different transmit beam pattern of the transmit beam patterns of the transmit node.

In some embodiments, the method of operation of the transmit node further comprises receiving, from a receive node, an indication of a preferred scanning beam pattern for each of the beam scanning stages and selecting one of the transmit beam patterns that corresponds to a combination of the preferred scanning beam patterns indicated by the receive node as a transmit beam pattern for transmission from the transmit node to the receive node.

In some embodiments, transmitting the known signal using each of the scanning beam patterns for each of the beam scanning stages over non-overlapping radio resource slots comprises transmitting a known signal using each of the scanning beam patterns for a first beam scanning stage over non-overlapping radio resource slots transmitting a known signal using each of the scanning beam patterns for a second beam scanning stage over non-overlapping radio resource slots. In some embodiments, the non-overlapping radio resource slots for the first beam scanning stage comprise at least one of a group consisting of: non-overlapping time resources, non-overlapping frequency resources, and non-overlapping code resources.

In some embodiments, the transmit node comprises multiple antennas and each beam scanning stage use a different subset of the antennas.

In some embodiments, the non-overlapping radio resource slots comprise non-overlapping time resources, non-overlapping frequency resources, and/or non-overlapping code resources.

Embodiments of a transmit node enabled to perform non-adaptive beam scanning for multiple transmit beam patterns of the transmit node that partition a service coverage area of the transmit node into multiple transmit partition cells are also disclosed. In some embodiments, the transmit node comprises a radio frequency transceiver comprising a radio frequency transmitter and a radio frequency receiver coupled to a plurality of antennas and at least one processor configured to transmit, via the radio frequency transmitter, a known signal using each of multiple scanning beam patterns for each of multiple of beam scanning stages over non-overlapping radio resource slots. The scanning beam patterns for the beam scanning stages are such that each unique combination of scanning beam patterns consisting of one scanning beam pattern from each of the beam scanning stages corresponds to a different transmit beam pattern of the transmit node.

Embodiments of a method of operation of a receive node to provide feedback to assist in non-adaptive beam scanning and selection by a transmit node to select a transmit beam pattern from multiple transmit beam patterns of the transmit node that partition a service coverage area of the transmit node into multiple transmit partition cells are disclosed. In some embodiments, the method of operation of the receive node comprises determining a preferred scanning beam pattern from multiple scanning beam patterns for each of multiple beam scanning stages and sending, to the transmit node, an indication of the preferred scanning beam pattern for each of the beam scanning stages.

In some embodiments, the scanning beam patterns for the beam scanning stages are such that each unique combination of scanning beam patterns consisting of one scanning beam pattern from each of the beam scanning stages corresponds to a different transmit beam pattern of the transmit beam patterns of the transmit node.

In some embodiments, determining the preferred scanning beam pattern for each of the beam scanning stages comprises, for each beam scanning stage, sequentially observing non-overlapping radio resource slots used by the transmit node for transmission of a known signal using each of the scanning beam patterns for the beam scanning stage until a signal quality metric value for the known signal for one of the scanning beam patterns for the beam scanning stage satisfies a predefined quality threshold, and selecting the one of the scanning beam patterns for the beam scanning stage for which the signal quality metric value of the known signal satisfies the predefined quality threshold as the preferred scanning beam pattern for the beam scanning stage.

In some embodiments, determining the preferred scanning beam pattern for each of the beam scanning stages comprises, for each beam scanning stage, observing non-overlapping radio resource slots used by the transmit node for transmission of a known signal using each of the scanning beam patterns for the beam scanning stage to thereby determine a quality metric value for the known signal for each of the plurality of scanning beam patterns for the beam scanning stage, and selecting one of the scanning beam patterns for the beam scanning stage based on the signal quality metric values of the known signal for the beam scanning patterns for the beam scanning stage as the preferred scanning beam pattern for the beam scanning stage. Further, in some embodiments, selecting the one of the scanning beam patterns as the preferred scanning beam pattern for the beam scanning stage comprises selecting the one of the scanning beam patterns for the beam scanning stage having the best signal quality metric.

In some embodiments, the non-overlapping radio resource slots comprise non-overlapping time resources, non-overlapping frequency resources, and/or non-overlapping code resources.

In other embodiments, a method of operation of a receive node to provide feedback to assist in non-adaptive beam scanning and selection by a transmit node to select a transmit beam pattern from multiple transmit beam patterns of the transmit node that partition a service coverage area of the transmit node into multiple transmit partition cells comprises determining a preferred scanning beam pattern from multiple scanning beam patterns for each of multiple beam scanning stages. The scanning beam patterns for the beam scanning stages are such that each unique combination of scanning beam patterns consisting of one scanning beam pattern from each of the beam scanning stages corresponds to a different transmit beam pattern of the transmit node. The method further comprises selecting one of the transmit beam patterns for the transmit node that corresponds to a combination of the preferred scanning beam patterns for the beam scanning stages as a selected transmit beam pattern for transmission from the transmit node to the receive node, and transmitting an indication of the selected transmit beam pattern to the transmit node.

Embodiments of a receive node enabled to provide feedback to assist in non-adaptive beam scanning by a transmit node to select a transmit beam pattern from multiple transmit beam patterns of the transmit node that partition a service coverage area of the transmit node into multiple transmit partition cells are disclosed. In some embodiments, the receive node comprises a radio frequency transceiver comprising a radio frequency transmitter and a radio frequency receiver coupled to a plurality of antennas, and at least one processor configured to determine a preferred scanning beam pattern from multiple scanning beam patterns for each of multiple beam scanning stages and send, to the transmit node via the radio frequency transmitter, an indication of the preferred scanning beam pattern for each of the beam scanning stages.

In some embodiments, the scanning beam patterns for the beam scanning stages are such that each unique combination of scanning beam patterns consisting of one scanning beam pattern from each of the beam scanning stages corresponds to a different transmit beam pattern of the transmit beam patterns of the transmit node.

In some embodiments, in order to determine the preferred scanning beam pattern for each of the beam scanning stages, the at least one processor is further configured to, for each beam scanning stage, sequentially observe, via the radio frequency receiver, non-overlapping radio resource slots used by the transmit node for transmission of a known signal using each of the scanning beam patterns for the beam scanning stage until a signal quality metric value for the known signal for one of the scanning beam patterns for the beam scanning stage satisfies a predefined quality threshold. The receive node is configured to select the one of the scanning beam patterns for the beam scanning stage for which the signal quality metric value of the known signal satisfies the predefined quality metric as the preferred scanning beam pattern for the beam scanning stage.

In some embodiments, in order to determine the preferred scanning beam pattern for each of the beam scanning stages, the at least one processor is further configured to, for each beam scanning stage, observe, via the radio frequency receiver, non-overlapping radio resource slots used by the transmit node for transmission of a known signal using each of the scanning beam patterns for the beam scanning stage to thereby determine a quality metric value for the known signal for each of the scanning beam patterns for the beam scanning stage. One of the scanning beam patterns for the beam scanning stage is selected based on the signal quality metric values of the known signal for the beam scanning patterns for the beam scanning stage as the preferred scanning beam pattern for the beam scanning stage. In some embodiments, the one of the scanning beam patterns for the beam scanning stage selected as the preferred scanning beam pattern for the beam scanning stage is the beam scanning pattern for the beam scanning stage having the best signal quality metric.

In some embodiments, the non-overlapping radio resource slots comprise non-overlapping time resources, non-overlapping frequency resources, and/or non-overlapping code resources.

Embodiments of a system enabling performance of non-adaptive beam scanning for multiple transmit beam patterns of a transmit node that partition a service coverage area of the transmit node into multiple transmit partition cells are disclosed. The system comprises a transmit node and a receive node. In some embodiments, the transmit node is configured to transmit a known signal using each of multiple scanning beam patterns for each of multiple beam scanning stages over non-overlapping radio resource slots. The scanning beam patterns for the beam scanning stages are such that each unique combination of scanning beam patterns consisting of one scanning beam pattern from each of the beam scanning stages corresponds to a different transmit beam pattern of the transmit node. In some embodiments, the receive node is configured to determine a preferred scanning beam pattern for each of the beam scanning stages based on the transmission of the known signal using the scanning beam patterns for each of the scanning stages.

In some embodiments, the receive node is further configured to send, to the transmit node, an indication of the preferred scanning beam pattern for each of the plurality of beam scanning stages.

In other embodiments, the receive node is further configured to select one of the transmit beam patterns for the transmit node that corresponds to a combination of the preferred scanning beam patterns for the beam scanning stages as a selected transmit beam pattern for transmission from the transmit node to the receive node and transmit an indication of the selected transmit beam pattern to the transmit node.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 11:
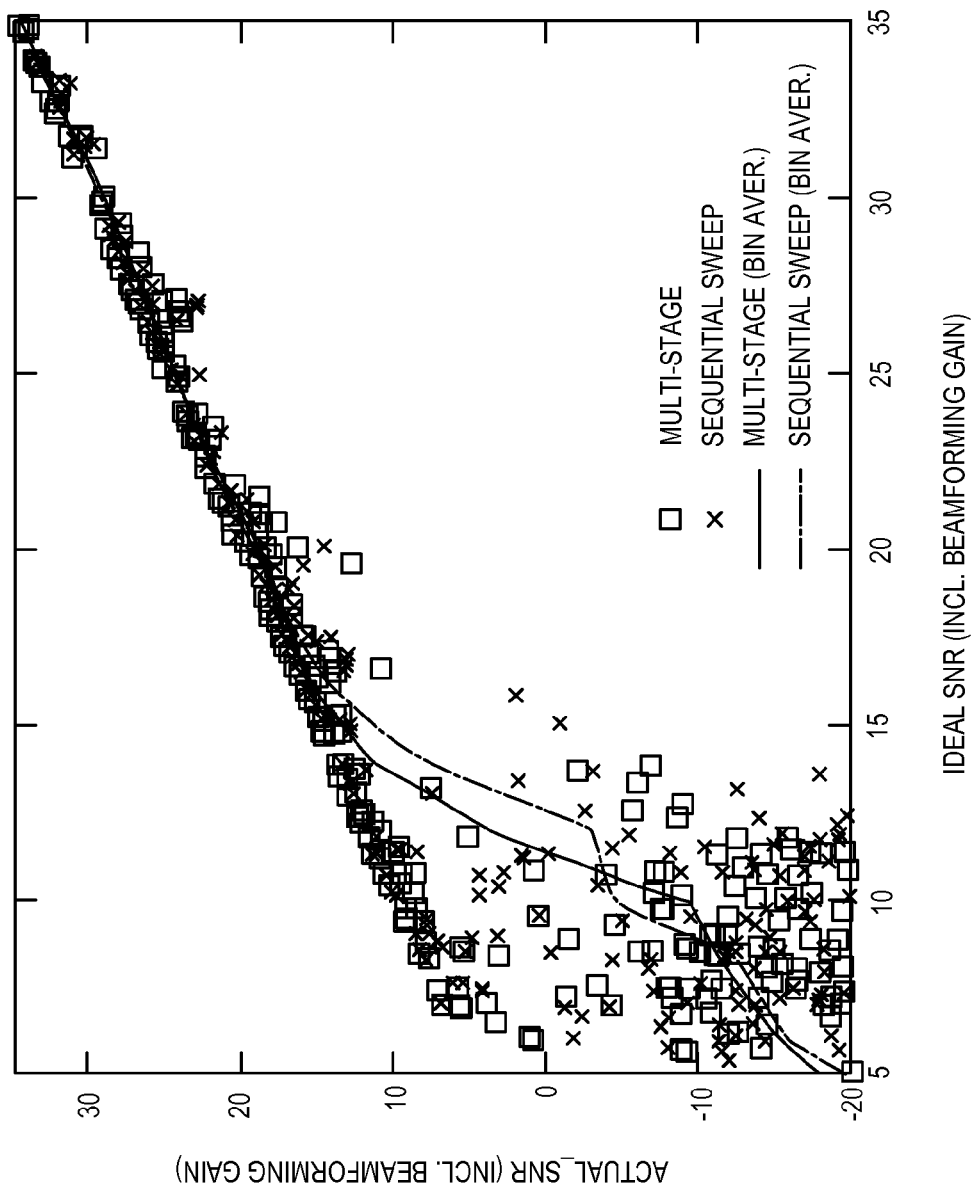
Figure 12:
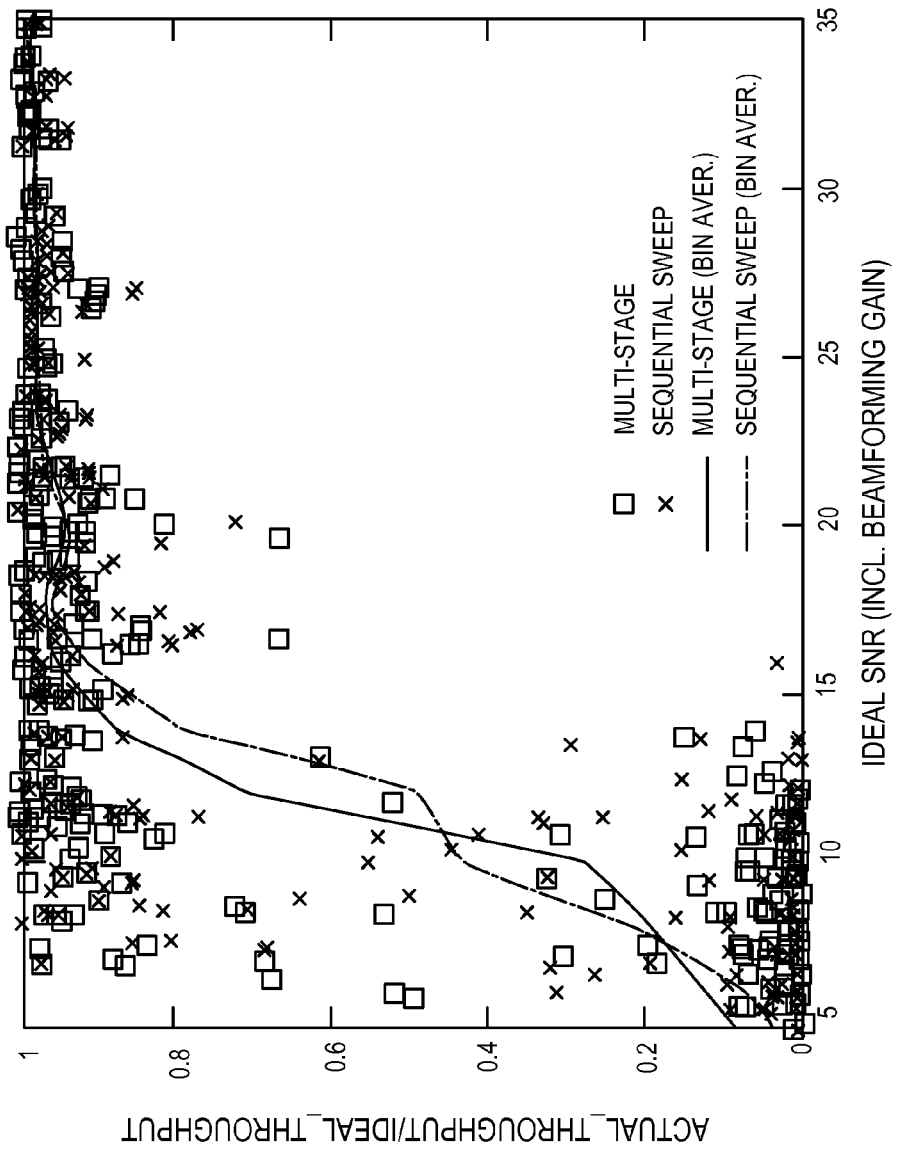
Figure 13:
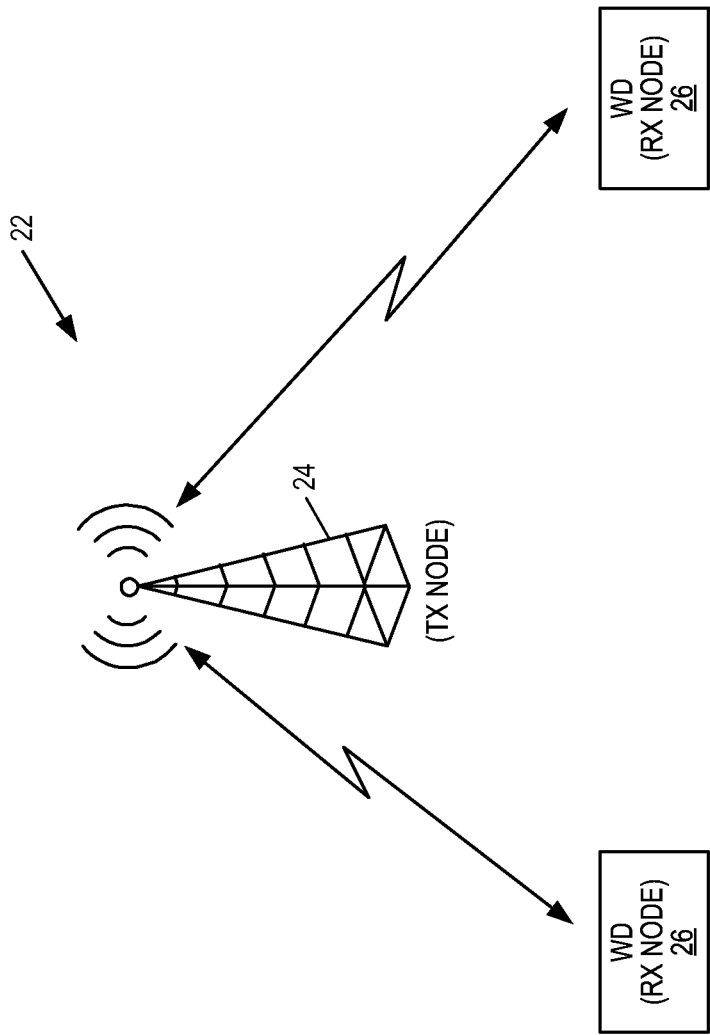
Figure 14:
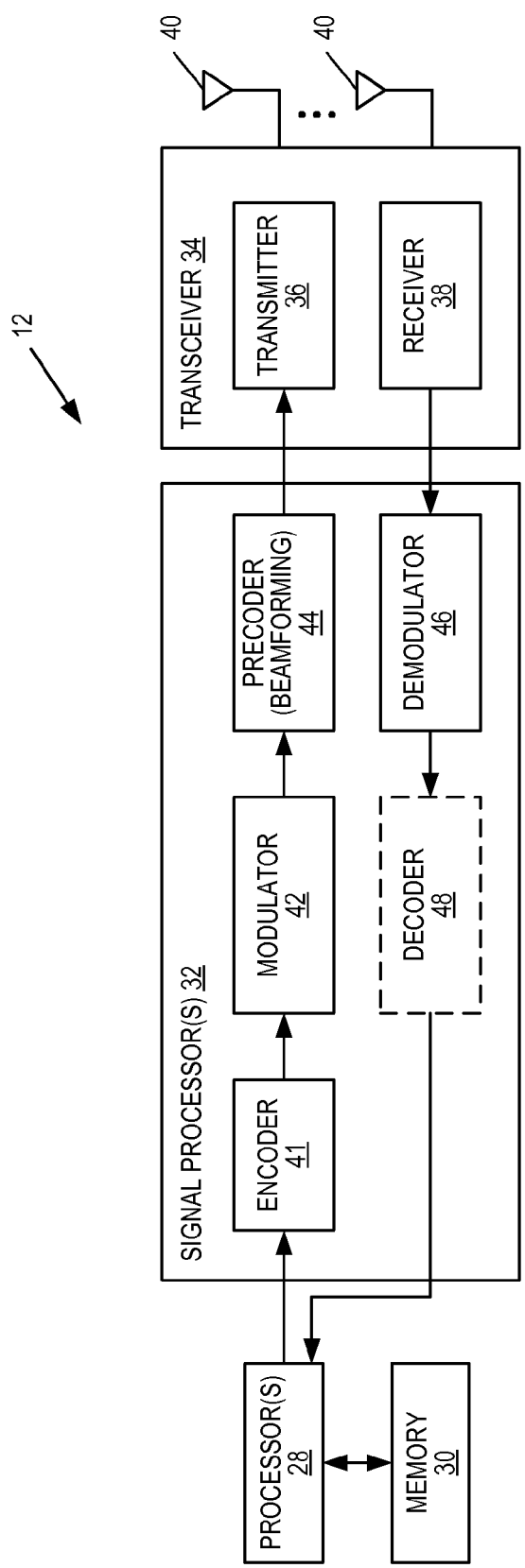
Figure 15:
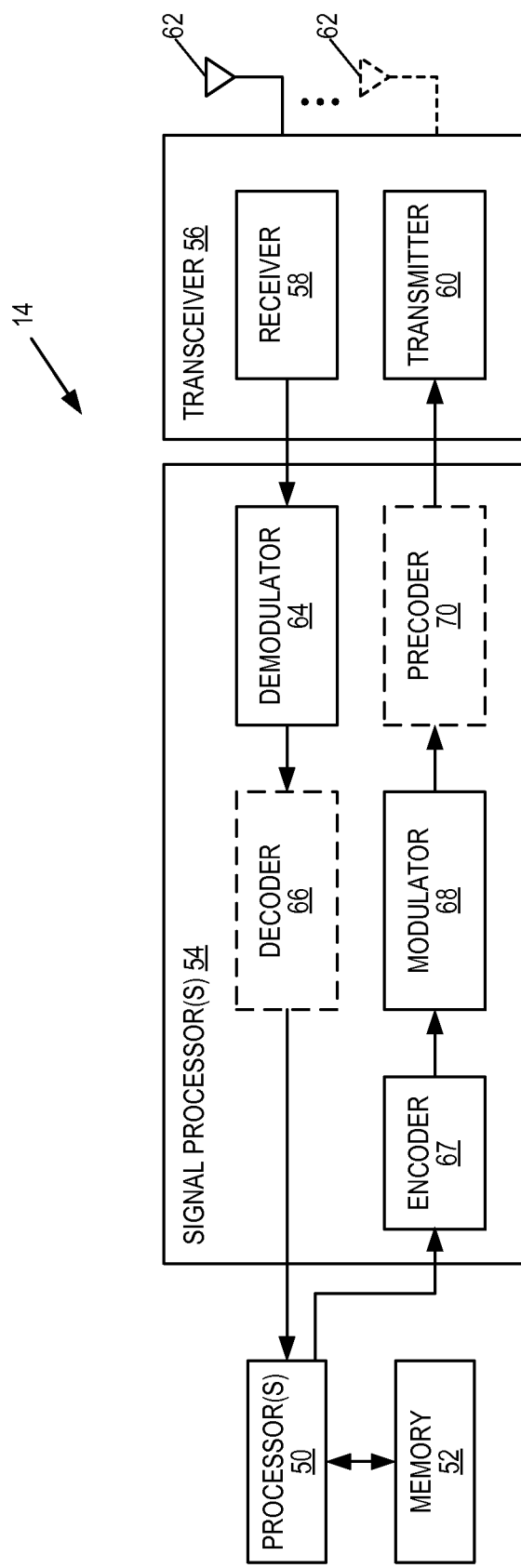
Figure 16:
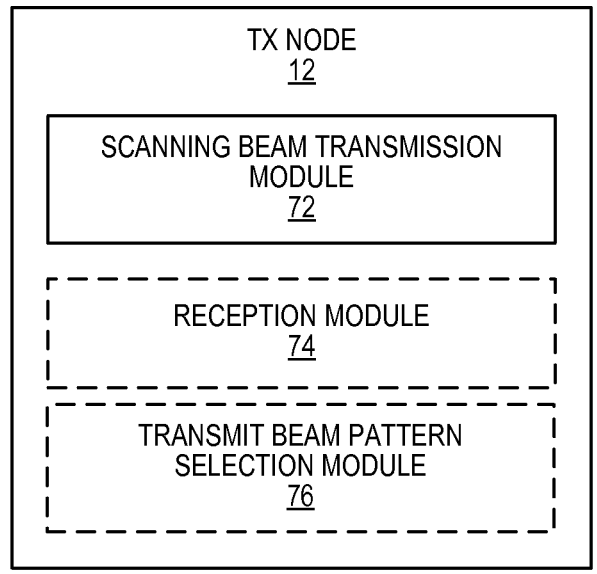
Figure 17:
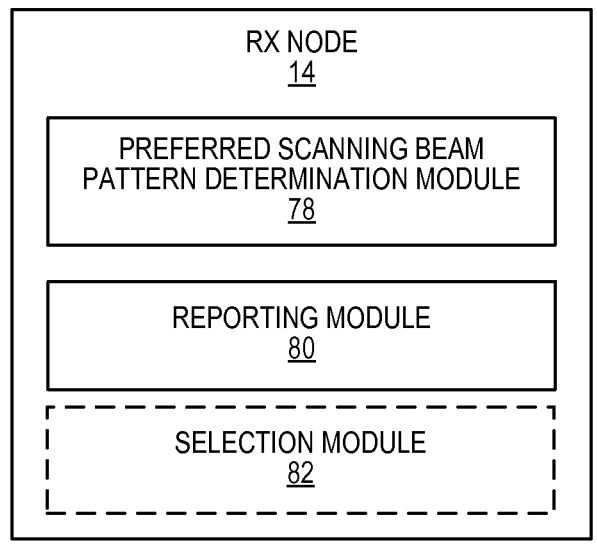

FIG. 11 compares the performance of the conventional SBS approach and one embodiment of the multi-stage beam scanning approach;

FIG. 12 illustrates a comparison similar to that of FIG. 11 but based on data throughput instead of Signal-to-Noise Ratio (SNR);

FIG. 13 illustrates one embodiment in which the transmit node and the receive node are implemented in a cellular communications network;

FIG. 14 is a block diagram of the transmit node according to one embodiment of the present disclosure;

FIG. 15 is a block diagram of the receive node according to one embodiment of the present disclosure;

FIG. 16 is a block diagram of the transmit node according to another embodiment of the present disclosure; and FIG. 17 is a block diagram of the receive node according to another embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments of systems and methods for identifying a transmit beam direction, or transmit beam pattern, for transmission from a transmit node to a receive node that optimize (s) the quality of the link between the transmit node and the receive node are disclosed herein. This is a crucial problem when two devices try to establish reliable communication links in high frequency (e.g., millimeter wave (mmW)) bands, since a transmitting device initially does not know in which direction a transmit beam should be formed in order to ensure the reliable reception of its signal (sent along such beam) by its intended receiver.

Embodiments are disclosed herein that utilize a pilot-assisted procedure for the transmit node to identify the proper transmit beam direction, or pattern, to use to communicate with a receive node. The transmit node sends pilot signals using different beam directions in a non-adaptive (and preferably but not necessarily non-receiver specific) manner. In some embodiments, the transmit node then determines the preferred beam direction to reach a particular receiver based on feedback from that receive node. As used herein, a "non-adaptive" beam scanning procedure is a beam scanning procedure in which the beam directions used for beam scanning are independent of feedback from the receive node during the beam scanning procedure. Note, however, that the beam scanning directions, or patterns, may change over time due to, e.g., relocation of access nodes or change in user traffic causing corresponding changes in the intended coverage area. Further, in some embodiments, the beam scanning procedure is non-receiver specific in that the beam scanning process performed is independent of how many receive nodes are trying to establish connection with the transmit node. A non-receiver specific and non-adaptive procedure is most efficient when the transmit node needs to find the proper transmit beam directions for a large number of receive nodes since common radio resources used for beam scanning can serve all potential receivers. Unlike some existing beam scanning procedures where the beam patterns used for beam scanning are adaptively changed in accordance with feedback from a receiver (see, for example, S. Hur et al., "Multilevel Millimeter Wave Beamforming for Wireless Backhaul," 2011 IEEE GLOBECOM Workshops, Dec. 5-9, 2011, pages 253-257 (hereinafter "Hur")), a non-adaptive procedure reduces the back-and-forth handshaking needed between the transmit node and each of its receive nodes to establish reliable communications. It is particularly attractive for setting up an initial connection when the transmit node is not even aware of the existence of a receive node.

Figure 1:
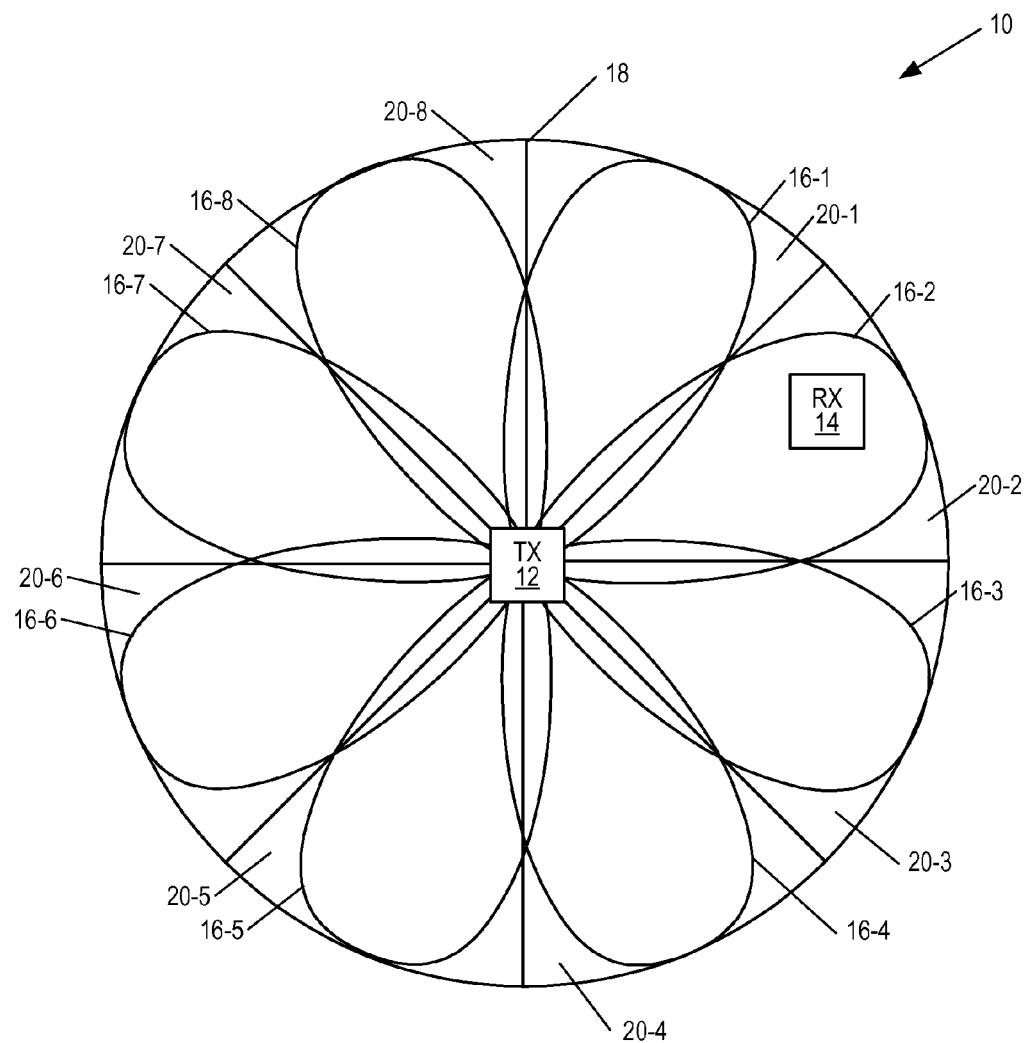
FIG. 1 illustrates a system including a transmit node that operates to perform a multi-stage beam scanning procedure in order to select beam patterns, or beam directions, for transmissions from the transmit node to receive nodes according to embodiments of the present disclosure.

FIG. 1 illustrates a system 10 including a transmit node 12 that operates to provide a non-receiver specific and non-adaptive beam scanning procedure in order to select beam patterns, or beam directions, for transmissions from the transmit node 12 to receiver nodes such as, e.g., a receive node 14 according to embodiments of the present disclosure. Note that while the embodiments described herein generally relate to a non-receiver specific beam scanning procedure, the embodiments disclosed herein may also be used for receiver-specific implementations. In some embodiments, the transmit node 12 is an access node in a wireless communication system such as, for example, a radio access node (e.g., a base station, a remote radio head, or the like) in a radio access network of a cellular communications system (e.g., a $3^{rd}$ Generation Partnership Program (3GPP) Long Term Evolution (LTE) cellular communications system) and the receive node 14 is a wireless device (e.g., a User Equipment (UE)) that accesses the wireless communication system via the access node.

In this example, the transmit node 12 transmits using a number of transmit beam patterns 16-1 through 16-8 (generally referred to herein collectively as transmit beam patterns 16 and individually as transmit beam pattern 16) that partition a service coverage area 18 of the transmit node 12 into a number of transmit partition cells 20-1 through 20-8 (generally referred to herein collectively as transmit partition cells 20 and individually as transmit partition cell 20). Note that while, in this example, the number of transmit beam patterns 16 and thus the number of transmit partition cells 20 is eight, the number (N) of transmit beam patterns 16 and transmit partition cells 20 may be any number greater than two. In many implementations, the number (N) can be large (e.g., 16, 64, 128, or larger).

In operation, the transmit node 12 performs a multi-stage beam scanning procedure in order to identify the best transmit beam pattern 16 (or equivalently the best transmit beam direction) for transmission to receive nodes, such as the receive node 14, in the service coverage area 18 of the transmit node 12. The multi-stage beam scanning procedure is non-adaptive and preferably, but not necessarily, non-receiver specific.

Figure 2:
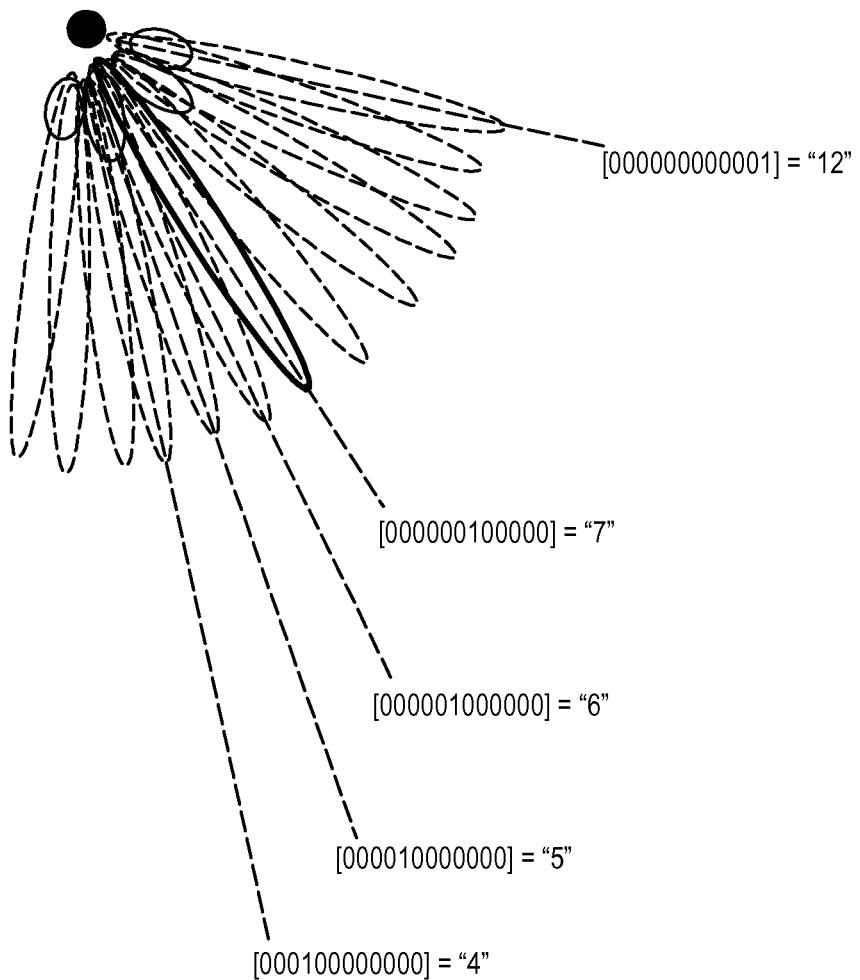
FIG. 2 is a graphical illustration of a Sequential Beam Sweeping (SBS) beam scanning approach.

Before discussing the multi-stage beam scanning procedure, it should be noted that one simple and commonly used approach to the transmit beam identification problem is to have the transmit node 12 periodically select one beam direction at a time in a round-robin fashion from a finite set of possible beam directions and transmit a pilot signal in the selected direction (see, for example, L. Zhou et al., "Efficient Codebook-Based MIMO Beamforming for Millimeter-Wave WLANs," 2012 IEEE $23^{rd}$ International Symposium on Personal Indoor and Mobile Radio Communications, Sep. 9-12, 2012, pages 1885-1889 (hereinafter "Zhou")). Using this approach, the transmit node 12 in effect scans through all possible beam directions, or transmit beam patterns 16, in a predetermined finite set of beam directions in a non-receiver specific and non-adaptive manner. The receive node 14 observes the pilot signal quality at each time slot and reports back to the transmit node 12 the index of the radio resource (time or frequency) slot within the cycle that yields the best received pilot signal quality. The best resource slot index in effect indicates which beam direction, or which transmit beam pattern 16, is most suitable for the transmit node 12 to use in order to reach the receive node 14. For a total of N different possible transmit beam patterns 16, this approach requires a total N resource slots (e.g., in time-division or frequency-division manners) to go through the N different transmit beam patterns 16. This approach is referred to herein as Sequential Beam Sweeping (SBS). The SBS approach is illustrated in FIG. 2. In FIG. 2, each transmit beam pattern 16 has a corresponding binary code.

The main problem of SBS is that the average and the worst amount of time needed for the receive node 14 to determine the index of the resource slot, or equivalently the index of the transmit beam pattern 16, are N/2 and N−1, respectively, regardless of how close the receive node 14 is located with respect to the transmit node 12. Even if the receive node 14 is located very close to the transmit node 12, and hence achieves a very high Signal-to-Noise Ratio (SNR), the receive node 14 may still have to wait for almost a nearly full cycle of N−1 time slots before the receive node 14 can identify the information needed to identify the proper transmit beam pattern 16. For receive nodes 14 with low SNR, e.g. those located far away from the transmit node 12, this is not a problem since these low-SNR receive nodes 14 need to wait for many time slots anyway in order to accumulate an adequate amount of received energy to correctly detect the best transmit beam pattern 16 in the presence of noise. However, for receive nodes 14 with high SNR, e.g. those located relatively close to the transmit node 12, a more sophisticated design of the beam scanning process may significantly reduce the number of resource slots, or the amount of radio resources in general, for these receive nodes 14 to identify the best beam direction.

One way of viewing SBS is that in effect, the index of the beam direction, or the transmit beam pattern 16, (or simply the beam index) as communicated to the receive node 14 through the time slot in which the transmit beam pattern 16 is used to send the pilot signal, is coded by a set of mutually orthogonal codes, as illustrated in FIG. 2. However, the use of such a set of orthogonal codes is not necessary to ensure unique identifiability of the beam index and is in fact very inefficient since a total of N bits, as illustrated in FIG. 2, is used to represent only N distinct possibilities, while N bits can be used to represent $2^N$ distinct possibilities.

In order to overcome these issues, rather than using the SBS approach, the transmit node 12 utilizes a multi-stage beam scanning procedure. As discussed below in detail, the multi-stage beam scanning procedure transmits a known (e.g., pilot) signal using multiple scanning beam patterns for multiple beam scanning stages. Using the multiple beam scanning stages and different sets of scanning beam patterns for each of the beam scanning stages, more efficient identification of the preferred beam pattern for transmission to each particular receive node (e.g., the receive node 14) can be achieved. As with the conventional SBS approach, the same beam scanning process is used to support beam finding for any number of receive nodes 14, and the beam patterns used in all beam scanning stages are non-adaptive in the sense that they do not depend on any feedback from the receive node(s) 14.

In each beam scanning stage, the receive node 14 observes the radio resource slots used for transmission of the known (e.g., pilot) signal for the scanning beam patterns for that beam scanning stage to determine a quality of the known signal at each of those radio resource slots. The scanning beam pattern that corresponds to the radio resource slot for which the known signal has the best signal quality is identified, or selected, as the preferred scanning beam pattern for that stage. Notably, the receive node 14 may, in some embodiments, have no knowledge of the scanning beam patterns used, in which case the receive node 14 identifies the radio resource slot having the best signal quality for the known signal. For each beam scanning stage, an indication (e.g., an index) of the radio resource slot having the best signal quality for the known signal is returned to the transmit node 12 as an indication of the preferred scanning beam pattern for that beam scanning stage. The indication of the preferred scanning beam patterns for the beam scanning stages may be returned individually for each stage (e.g., at each beam scanning stage) or, e.g., as a single report after all beam scanning stages are complete. The sets of scanning beam patterns for the beam scanning stages are designed in such a way that the transmit node 12 can uniquely identify the best beam pattern to communicate with the receive node 14 based on the preferred scanning beam patterns reported by the receive node 14. Again, the preferred scanning beam patterns may, in some embodiments, be reported as radio resource slot indices, as discussed above. The best beam pattern selected for transmission to the receive node 14 may also be referred to herein as a transmit beam pattern in order to differentiate this beam pattern from the scanning beam patterns used for the different beam scanning stages. In effect, the multi-stage beam scanning approach disclosed herein uses a set of codes that may not be orthogonal, but is exponentially more efficient than an orthogonal set, to represent the beam index so that much fewer number of channel uses (e.g., radio resource slots) are needed in order for the receive node 14 to uniquely identify the index of the desired beam that points to receive node 14 when the SNR is sufficiently high.

Before discussing the multi-stage beam scanning process in detail, a discussion of the general beam finding problem, the transmit beam finding problem, and the SBS approach are beneficial.

General Problem of Beam Finding

Let $n_T$ and $n_R$ denote, respectively, the number of transmit antennas at a transmitter and the number of receive antennas at a receiver. Let H be a $n_T$ by $n_R$ matrix whose element in the ith row and the jth column is the complex-valued channel response from the jth transmit antenna of the transmitter to the ith receive antenna of the receiver. For any given transmit beamforming (BF) weight vector $p_T = [p_{T,1}, p_{T,2}, \ldots, p_{T,n_T}]^T$ and receive BF weight vector $p_R = [p_{R,1}, p_{R,2}, \ldots, p_{R,n_R}]^T$, the signal received at the receiver may be modeled simply as $$r[k] = p_R^H H p_T s[k] + w[k], \qquad (1)$$

where k denotes an index to the channel use, s[k] denotes a pilot signal known to both the transmitter and the receiver, and w[k] denotes the underlying noise-plus-interference. Notably, the use of a BF weight vector forms a corresponding beamforming pattern that dictates how much transmit power is emitted at each direction. Hence, BF weight vectors, or simply BF vectors, are also referred to herein as beamforming patterns. The goal is to identify, without knowing the channel matrix H, the best transmit BF vector $p_T$ at the transmitter and the best receive BF vector $p_R$ at the receiver that maximize the link quality between the transmitter and the receiver as measured by a certain function $q(p_T, p_R | H)$. In other words, we are interested in finding $$(\bar{p}_T, \bar{p}_R) = \underset{p_T \in \mathcal{P}_T, p_R \in \mathcal{P}_R}{\operatorname{argmax}} q(p_T, p_R | H), \qquad (2)$$

through a sequence of probing transmissions of known signals, referred to as beam scans, as described below, where $\bar{p}_T$ and $\bar{p}_R$ denote the best transmit and receive BF vectors, respectively, and $\mathcal{P}_T$ and $\mathcal{P}_R$ denote the sets of permissible transmit and receive BF vectors under consideration, respectively.

An example of the link quality function is $$q(p_T, p_R | H) = f(|p_R^H H p_T|^2),$$

where $f(\bullet)$ is some monotonically non-decreasing real function. In this case, if H were known to the transmitter and/or the receiver, the best transmit and receive BF vectors, $\bar{p}_T$ and $\bar{p}_R$, are simply the left and right singular vectors of H. However, H is in general known neither to the transmitter nor to the receiver, so the best BF vectors $\bar{p}_T$ and $\bar{p}_R$ must be found without the knowledge of H.

Transmit Beam Finding Problem

The transmit beam fining problem addressed herein is finding the best transmit BF vector $\bar{p}_T$ assuming that a certain (e.g., the best) receive BF vector $p_R$ is used. (In a trivial case, the vector $p_R$ may contain only one non-zero element leading to an omni-directional reception using only a single antenna element.) In this case, our goal in Equation (2) reduces to $$\bar{p}_T = \underset{p_T \in \mathcal{P}_T}{\operatorname{argmax}} q'(p_T | H) \qquad (3)$$

where $q'(\bullet | \bullet)$ may be given by $$q'(p_T | H) \equiv \max_{p_R \in \mathcal{P}_R} q(p_T, p_R | H),$$

which assumes that the best corresponding receive BF vector is used.

In order for the transmitter to find $\bar{p}_T$ without a priori knowledge of H, a sequence of test beams are typically transmitted, using the corresponding set of BF vectors $\{\tilde{p}_T[n]\}_{n=0}^{N_s-1}$, over $N_s$ different radio resource slots (e.g., time, frequency, and/or code) to the receiver. Upon receiving and measuring the signals received over these resource slots, the receiver then feeds back to the transmitter certain measurement reports. Based on the measurement reports, the transmitter determine the best transmit BF vector to be used for subsequent communications. These test beams, and associated test BF vectors $\{\tilde{p}_T[n]\}_{n=0}^{N_s-1}$, may or may not be known at the receiver. The received signal $r[n] \equiv (r[n,0], r[n,1], \ldots, r[n,N_u-1])$ over the nth resource slot can be modeled as $$r[n,k] = h\tilde{p}_T[n] s[n,k] + w[n,k]$$

for k=0, 1, 2, . . . , $N_u$ and n=0, 1, 2, . . . , $N_s$−1, where $N_u$ denotes the number of chips (or channel uses) within each of the $N_s$ resource slots, s[n]≡(s[n,0],s[n,1], . . . , s[n,$N_u$−1]) denotes the pilot signal transmitted in the nth slot, and w[n]≡(w[n,0], w[n,1], . . . , w[n,$N_u$−1]) denotes the noise-plus-interference in the nth slot. Based on the received signals $\{r[n,k]\}_{n\in\{0,1,\ldots,N_s\},k\in\{0,1,\ldots,N_u\}}$, the receiver constructs a certain Beam Measurement Report (BMR) to send back to the transmitter so that the transmitter can determine the best transmit BF vector. A key question is how small can $N_s$ be in order to ensure that the transmitter can determine what the best BF vector is from the receiver's feedback.

If there is no limit on the amount of feedback allowed for a BMR, the receiver can, in principle, feed back the received signals (or an arbitrarily accurate approximation of such) to the transmitter. In this case, only $N_s = n_T$ test beams are needed for the transmitter to compute the best transmit BF vector. For example, the test BF vectors $\{\tilde{p}_T[n]\}_{n=0}^{N_s-1}$ can be chosen as any set of basis vectors that span the $n_T$ dimensional complex vector space, and the received signals can be expressed in matrix form as $$\underbrace{[r[0], r[1], \ldots, r[N_s-1]]}_{R} =$$

$$h\underbrace{[\tilde{p}_T[0], \tilde{p}_T[1], \ldots, \tilde{p}_T[N_s-1]]}_{P_T} S + [w[0], w[1], \ldots, w[N_s-1]],$$

where S is a $N_s \times (N_u N_s)$ block diagonal matrix with s[n] being the nth diagonal block. The transmitter can simply estimate the channel response by h=$RS^H P_T^H (P_T(SS^H) P_T^H)^{-1}$, from which the best transmit BF vector $\bar{p}_T$ that solves Equation (3) can be computed regardless of how large the permissible set $P_T$ is. Therefore, there is a trivial upper bound on $N_s$ as $N_s \leq n_T$. However, if the number of transmit antennas $n_T$ is large, setting $N_s = n_T$ would lead to an unacceptable amount of overhead. Furthermore, the link capacity needed to support such large BMRs is often prohibitive especially when the transmitter has to support multiple receivers. In practice, the amount of feedback allocated for a BMR from the receiver to the transmitter can be rather limited.

To minimize the amount of feedback required for the transmitter to determine the best transmit BF vector for communicating with the receiver, we consider the case when the set $P_T$ of permissible BF vectors is finite so that the transmitter only needs to determine the index of the best BF vector in $P_T$.

Note that in addition to having a finite size, the set $P_T$ may be further restricted to satisfy certain constraints due to hardware limitations. For example, if the transmitter employs an analog BF front-end, each antenna weight can only apply a phase shift to the signal transmitted over each antenna. In other words, each element of a vector $p_T \in P_T$ must have a constant modulus (e.g., on the unit circle of the complex plane). In this case, the set $P_T$ may be given by $\{p_{T,i}\}_{i=1}^N$, where N=|$P_T$|, $$p_{T,i} \equiv \left(1, e^{-j\frac{2\pi}{\lambda}(x_2-x_1)^T d(\theta_i,\varphi_i)}, e^{-j\frac{2\pi}{\lambda}(x_3-x_1)^T d(\theta_i,\varphi_i)}, \ldots, e^{-j\frac{2\pi}{\lambda}(x_{n_T}-x_1)^T d(\theta_i,\varphi_i)}\right)^T,$$

for i=1, 2, . . . , N, λ denotes the wavelength of the radio signal, $x_j$ denotes the three-dimensional coordinate vector of the jth antenna, $\theta_i$ and $\varphi_i$ represent, respectively, the azimuth angle and the elevation angle with respect to the antenna array associated with the ith BF vector $p_{T,i} \in P_T$, and $$d(\theta_i,\varphi_i) \equiv (\cos \varphi_i \cos \theta_i, \cos \varphi_i \sin \theta_i, \sin \varphi_i)^T$$

is the unit-norm directional vector pointing at the azimuth angle $\theta_i$ and the elevation angle $\varphi_i$. In other words, the set of BF vectors $P_T = \{p_{T,i}\}_{i=1}^N$ are chosen to match a predetermined set $\{(\theta_i, \varphi_i)\}_{i=1}^N$ of azimuth and elevation angle pairs for beamforming.

Sequential Beam Sweeping

For instance, with the conventional SBS (see for example, Zhou), the transmitter transmits a pilot signal using the ith BF vector $p_{T,i} \in P_T$ at the ith resource slot. The receiver only needs to feed back to the transmitter the index, say i*, of the best resource slot corresponding to the most preferable beam in $P_T$. The most preferable beam may be the one that yields the best signal quality, in terms of, for example, the highest signal strength, the highest SNR, or the least channel estimation error. Alternatively, the most preferable beam may be that used in the first resource slot that yields a received signal quality exceeding a predefined threshold value. In either case, based on this index, the transmitter knows the best BF vector $p_{T,i^*} \in P_T$ to reach the receiver, since there is a one-to-one correspondence between the slot index and the beam index in $P_T$. The amount of feedback needed for SBS is therefore $\log_2 N$ bits.

To provide a better comparison between SBS and the multi-stage beam scanning scheme described below, let $S_i$ denote the portion, or partition cell, of the coverage area of the transmitter in which a receiver selects the transmit beam $p_{T,i} \in P_T$ used in slot i as preferable. The set $\Omega = \{S_i\}_{i=1}^M$ therefore forms a partition of the coverage area (except for a set of locations with zero volume). Each $S_i$ is referred to herein as a partition cell of the coverage area, and the set $\Omega$ is referred to herein as a set of partition cells of the coverage area. For example, $S_i$ may be defined as $$S_i \equiv \{x \in \mathbb{R}^3 : \max_{p_R \in \mathcal{P}_R} q(p_{T,i}, p_R | H_x) > \max_{j \neq i} \max_{p_R \in \mathcal{P}_R} q(p_{T,j}, p_R | H_x)\}$$

if the preferable beam is chosen in comparison with other beams, where $H_x$ denotes the channel response between the transmitter and a receiver located at point x, or $$S_i \equiv \{x \in \mathbb{R}^3 : \max_{p_R \in \mathcal{P}_R} q(p_{T,i}, p_R | H_x) > \gamma \text{ and }$$

$$\max_{j < i} \max_{p_R \in \mathcal{P}_R} q(p_{T,j}, p_R | H_x) \leq \gamma\}$$

if the preferable beam is chosen to be the first sufficiently good beam, where γ denotes a predefined threshold. With the conventional SBS, at any given slot i, only receivers located in the partition cell $S_i$ can collect significant signal energy from the transmitter.

However, a major problem of the conventional SBS is its signaling inefficiency. At any given time, only a small portion of the entire coverage can receive a meaningful signal from the transmitter. As a result, only a small amount of information, ($\log_2 N$)/N bits, regarding the beam direction is conveyed on average over each resource slot, and the number of resource slots $N_s$ needed for the transmitter to determine the proper beam direction to transmit to a receiver is proportional to N (i.e., $N_s = O(N)$).

Multi-Stage (Tree) Beam Scanning

According to the embodiments disclosed herein, the transmit node 12 utilizes a multi-stage beam scanning approach that allows the transmit node 12 to find the proper beam pattern, or beam direction, in a substantially smaller number of resource slots than SBS with essentially the same feedback requirement. Specifically, the number of resource slots needed to identify one out of N possible beam patterns, or beam directions, using the multi-stage beam scanning approach is proportional to log N (i.e., $N_s = O(\log N)$).

Let $N = \Pi_{m=1}^{M} N_m$ be a factorization of N into M integers, each greater than one. The multi-stage beam scanning process uses M stages to select the best of N transmit beam patterns, or transmit beam directions, for transmission from the transmit node 12 to, e.g., the receive node 14. In the mth stage, beam scanning (e.g., SBS) is performed over a set of $N_m$ scanning beam patterns from a per-stage scanning beam pattern set $P_T^{(m)}$, where $N_m = |P_T^{(m)}|$. The total number of resource slots required for the multi-stage beam scanning approach is therefore $N_u = \Sigma_{m=1}^{M} N_m$. Since the sum of M numbers can be substantially less than their product, $N_u$ can be significantly smaller than N. The difference is maximized when $N_m$ is minimized to 2, and hence the number of stages M is maximized. For example, when $N_m = b$ for all m, then $M = \log_b N$ and $N_u = b \log_b N$.

In some embodiments, for the mth stage of the multi-stage beam scanning process, the receive node 14 sends the index $i_m^*$ of the resource slot in that stage with the most preferable scanning beam pattern in $P_T^{(m)}$ to the transmit node 12. Note that the index $i_m^*$ of the resource slot in that stage with the most preferable beam pattern in $P_T^{(m)}$ is only an example. Any suitable indication of the most preferable scanning beam pattern in $P_T^{(m)}$ may be fed back to the transmit node 12. The feedback need not be done immediately after each stage but instead can be done after observing all M beam scanning stages. The most preferable scanning beam pattern may be determined by the scanning beam pattern that yields the best link quality during that stage or by the first scanning beam pattern that yields the link quality exceeding a predetermined threshold. The total amount of feedback needed is therefore $\Sigma_{m=1}^{M} \lceil \log_2 N_m \rceil \approx \log_2 N$ bits, which is essentially the same as that of the conventional SBS, where $\lceil x \rceil$ denotes the ceiling function (i.e., the smallest integer that is no less than x). Unlike some existing beam scanning methods where the beam patterns used are adaptively changed from one stage to another in accordance with the feedback from a receiver (see, for example, Hur), the multi-stage beam scanning procedure is non-adaptive and, therefore, avoids the back-and-forth handshaking needed between the transmitter and each of its receivers to establish reliable communications that are required for an adaptive approach.

The different scanning beam patterns, and thus the different possible values of the most preferable slot index $i_m^*$ chosen for the mth stage, in effect divide the service coverage area of the transmit node 12 into a set of partition cells $\Omega^{(m)} \equiv \{S_1^{(m)}, S_2^{(m)}, \ldots, S_{N_m}^{(m)}\}$ in such a way that any pair of $\{S_i^{(m)}\}$ are disjoint, the union of all $\{S_i^{(m)}\}_{i=1}^{M}$ equals to the coverage area of the transmit node 12, and $S_{i_m}^{(m)}$ is the most likely partition cell in $\Omega^{(m)}$ that the receive node 14 falls into. The set of partition cells $\Omega^{(m)} \equiv \{S_1^{(m)}, S_2^{(m)}, \ldots, S_{N_m}^{(m)}\}$ are referred to herein as a set of scanning partition cells for the mth stage and are to be distinguished from the set of partition cells $\Omega \equiv \{S_i\}_{i=1}^{M}$ induced by the transmit beam patterns. The set of partition cells $\Omega \equiv \{S_i\}_{i=1}^{M}$ induced by the transmit beam patterns is referred to herein as a set of transmit partition cells. For example, $S_i^{(m)}$ may be defined as $$S_i^{(m)} \equiv \{x \in \mathbb{R}^3 : \max_{p_R \in \mathcal{P}_R} q(p_{T,i}^{(m)}, p_R \mid H_x) > \max_{j \neq i} \max_{p_R \in \mathcal{P}_R} q(p_{T,j}^{(m)}, p_R \mid H_x)\}$$

if the preferable scanning beam pattern is chosen in comparison with other scanning beam patterns, where $p_{T,i}^{(m)} \in P_T^{(m)}$ for all i, or $$S_i^{(m)} \equiv \{x \in \mathbb{R}^3 : \max_{p_R \in \mathcal{P}_R} q(p_{T,i}^{(m)}, p_R \mid H_x) > \gamma \text{ and}$$

$$\max_{j < i} \max_{p_R \in \mathcal{P}_R} q(p_{T,i}^{(m)}, p_R \mid H_x) \leq \gamma\}$$

if the preferable scanning beam pattern is chosen to be the first sufficiently good scanning beam pattern, where $\gamma$ denotes a predefined threshold.

The collection of different scanning partition cells $\{\Omega^{(m)}\}_{m=1}^{M}$ is constructed such that the intersection of each combination of M scanning partition cells, each chosen from one of the sets of scanning partition cells $\Omega^{(m)}$, corresponds to a transmit partition cell in the set of transmit partition cells $\Omega$ induced by the set of transmit BF vectors $P_T$, which is also referred to herein as the set of transmit beam patterns. More precisely, for each preferable beam pattern or radio resource slot index $i^* \in \{1, 2, \ldots, N\}$, there exists a unique vector $(i_1^*, i_2^*, \ldots, i_M^*)$ of indices such that $$S_{i^*} \cong \bigcap_{m=1}^{M} S_{i_m}^{(m)}, \quad (4)$$

where $\cong$ denotes equality of two sets except for a subset of negligible volume (i.e., measure zero), $S_i \in \Omega$ and $S_{i_m}^{(m)} \in \Omega^{(m)}$. In other words, the indices $(i_1^*, i_2^*, \ldots, i_M^*)$ from all M stages collectively specify the transmit partition cell in the set of transmit partition cells $\Omega$ in which the receive node 14 is located and thus the most preferable transmit beam pattern $p_{T,i^*} \in P_T$ to be used to reach that receive node 14. Each index $i_m^*$ provides some information, but no one index $i_m^*$ provides full information about the preferable transmit beam pattern $p_{T,i} \in P_T$. In fact, each index $i_m^*$ provides $\log_2 N_m$ bits about the index $i^*$, so each radio resource slot at the mth stage on average conveys $(\log_2 N_m)/N_m$ bits of information regarding the preferable beam direction, which can be substantially larger than $(\log_2 N)/N$ since $(\log x)/x$ is a monotonic decreasing function for $x \geq e$.

Construction of Per-Stage Beam Pattern Sets

Given a set $P_T$ of permissible transmit beam patterns, each scanning beam pattern $p_{T,i}^{(m)} \in P_T^{(m)}$ for the mth stage may be constructed by a particular (linear) combination of one or more of the transmit beam patterns in $P_T$. Different scanning beam patterns, within the same beam scanning stage or from different beam scanning stages, can be formed by different combinations of transmit beam patterns in $P_T$. The resulting scanning beam patterns are designed in such a way that the induced sets of scanning partition cells $\{\Omega^{(m)}\}_{m=1}^{M}$ satisfies Equation (4) and can be implemented under the hardware constraints of the transmit node 12.

Figure 3A:
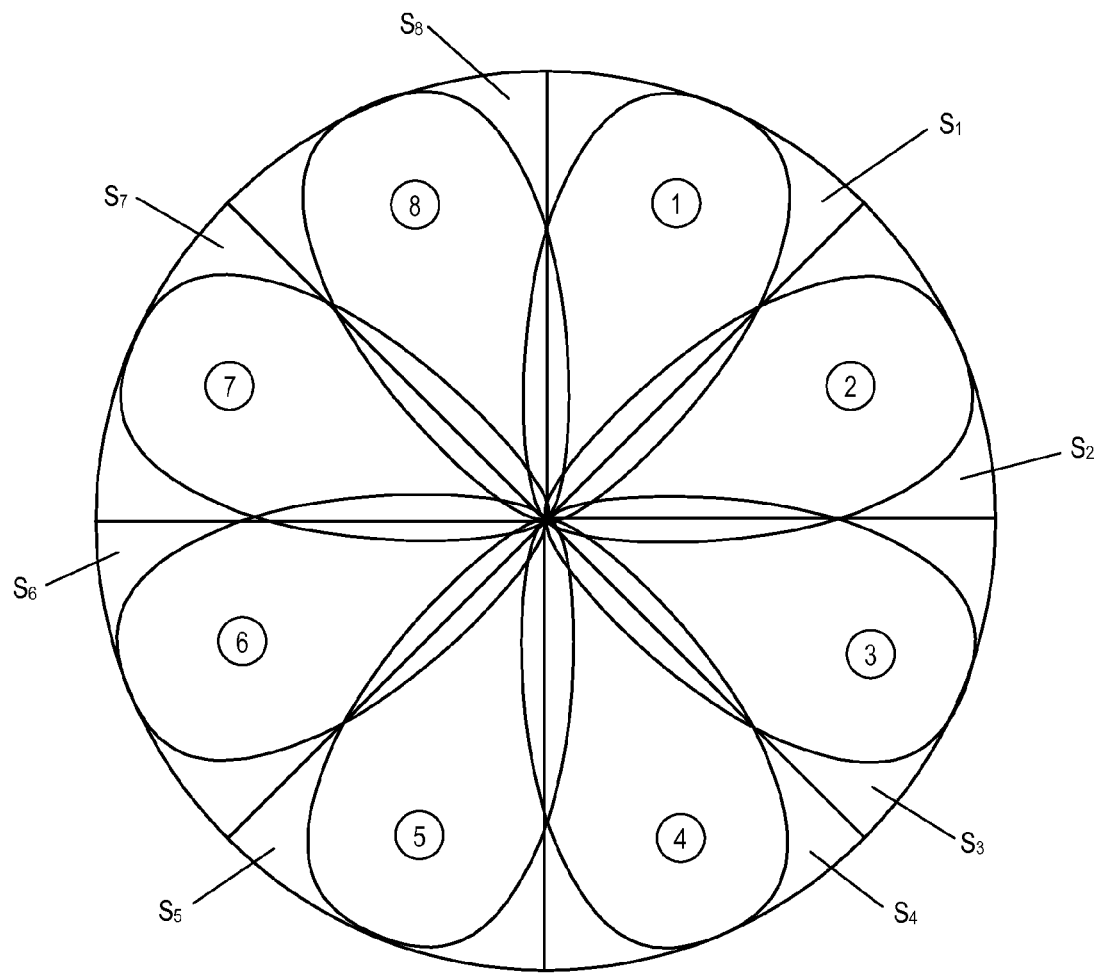
FIGS. 3A through 3G illustrate one example of a set of scanning beam patterns for a multi-stage beam scanning procedure for one example of a set of transmit beam patterns that includes eight transmit beam patterns.

FIGS. 3A through 3G illustrate scanning beam patterns for one example in which the set of transmit beam patterns $P_T$ includes the eight beam patterns illustrated in FIG. 3A.

Figure 3B:
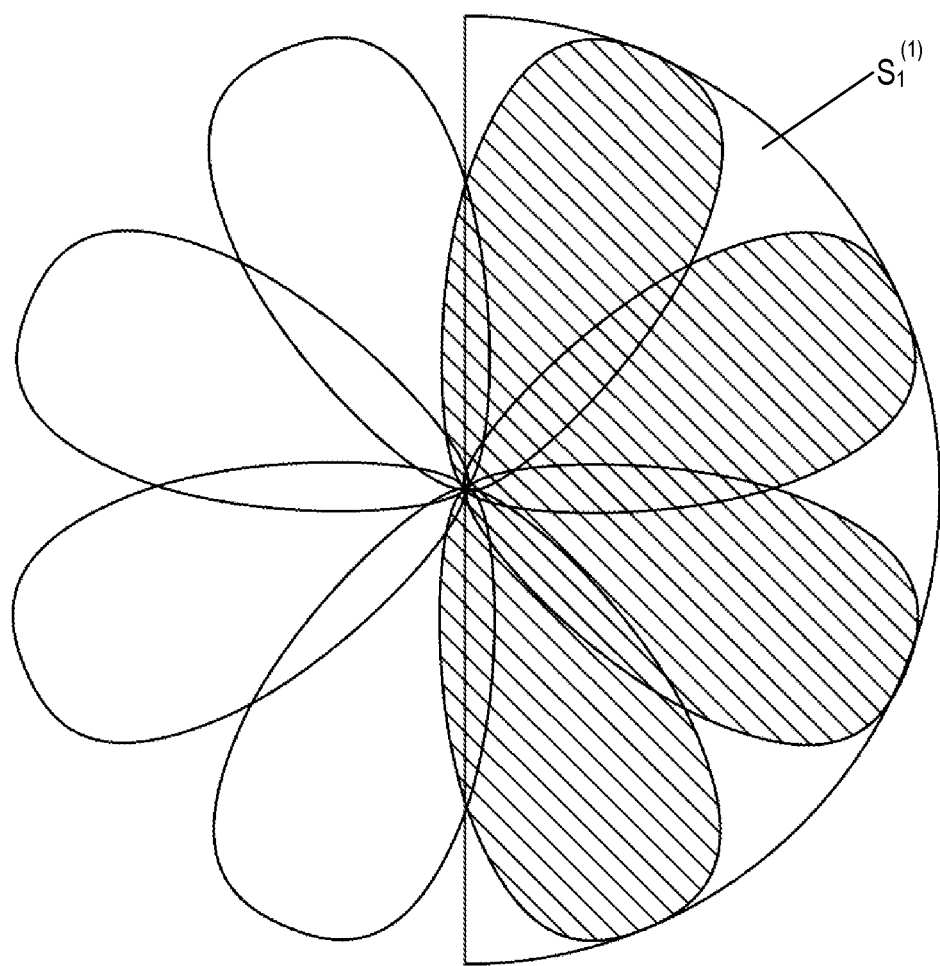
Figure 3C:
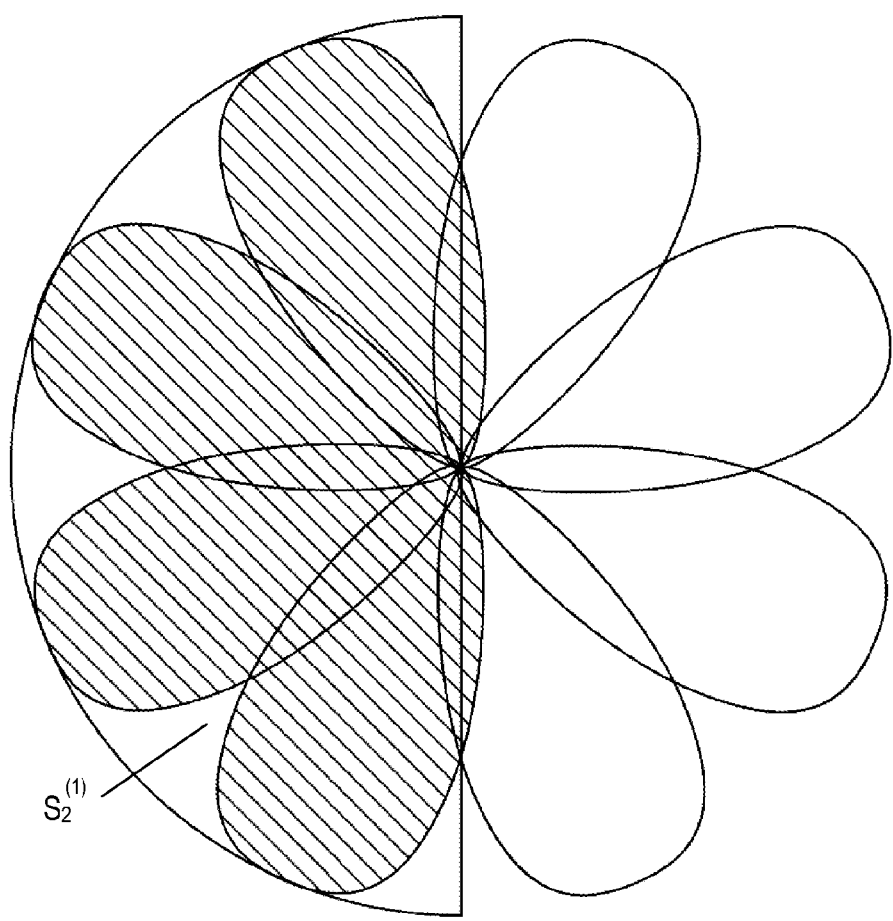

The transmit beam patterns induce the set of transmit partition cells Ω including, in this example, transmit partition cells $S_1$ through $S_8$. In this example, there are three beam scanning stages (i.e., M=3), and the number of scanning beam patterns in each of the beam scanning stages is two (i.e., $N_1=N_2=N_3=2$). FIGS. 3B and 3C illustrate the scanning beam patterns in the set of scanning beam patterns $P_T^{(1)}$ for the first beam scanning stage. As illustrated in FIG. 3B, the first scanning beam pattern $p_{T,1}^{(1)}$ for the first beam scanning stage is the combination, or union, of the transmit beam patterns 1, 2, 3, and 4. The first beam scanning pattern $p_{T,1}^{(1)}$ for the first beam scanning stage corresponds to the first scanning partition cell $S_1^{(1)}$ in the set of scanning partition cells $Ω^{(1)}$ for the first beam scanning stage. As illustrated in FIG. 3C, the second scanning beam pattern $p_{T,2}^{(1)}$ for the first beam scanning stage is the combination, or union, of the transmit beam patterns 5, 6, 7, and 8. The second beam scanning pattern $p_{T,2}^{(1)}$ for the first beam scanning stage corresponds to the second scanning partition cell $S_2^{(1)}$ in the set of scanning partition cells $Ω^{(1)}$ for the first beam scanning stage. In one embodiment, the index $i_1^*$ is set to 0 if the preferred scanning beam pattern for the first beam scanning stage is the first scanning beam pattern $p_{T,1}^{(1)}$ for the first beam scanning stage and set to 1 if the preferred scanning beam pattern for the first beam scanning stage is the second beam $p_{T,2}^{(1)}$ scanning pattern for the first beam scanning stage.

Figure 3D:
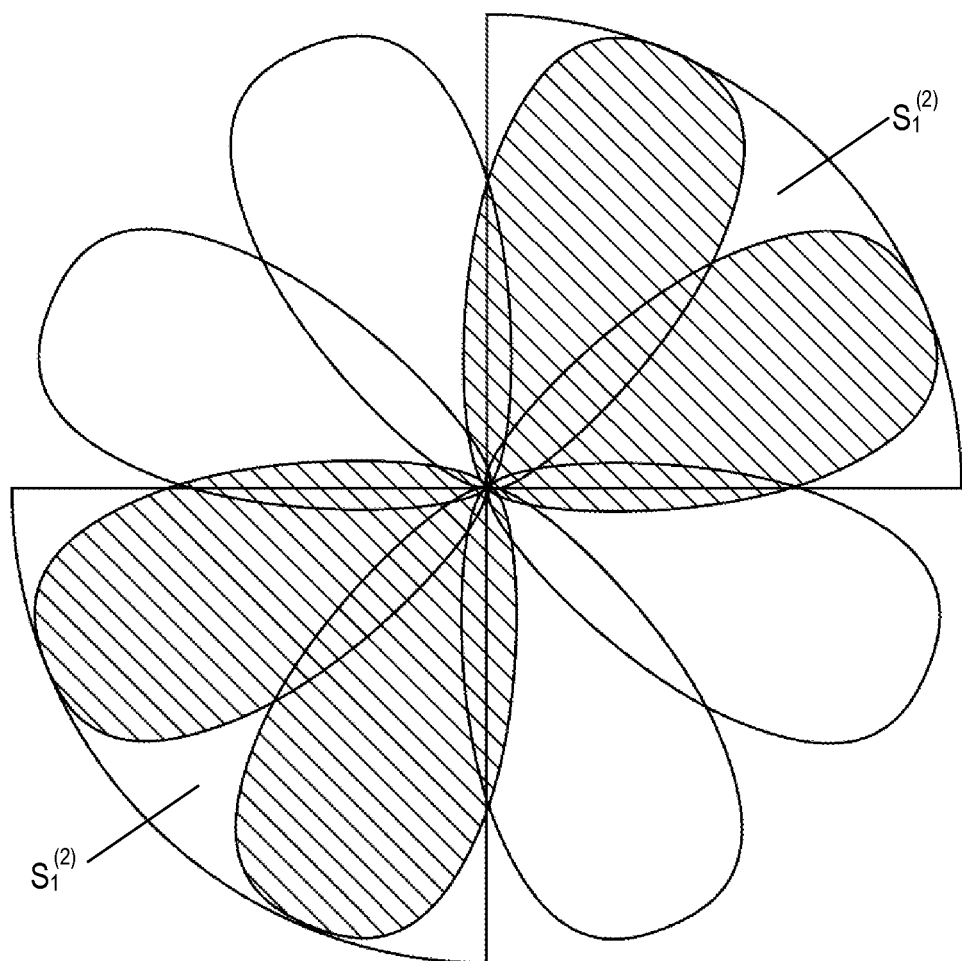
Figure 3E:
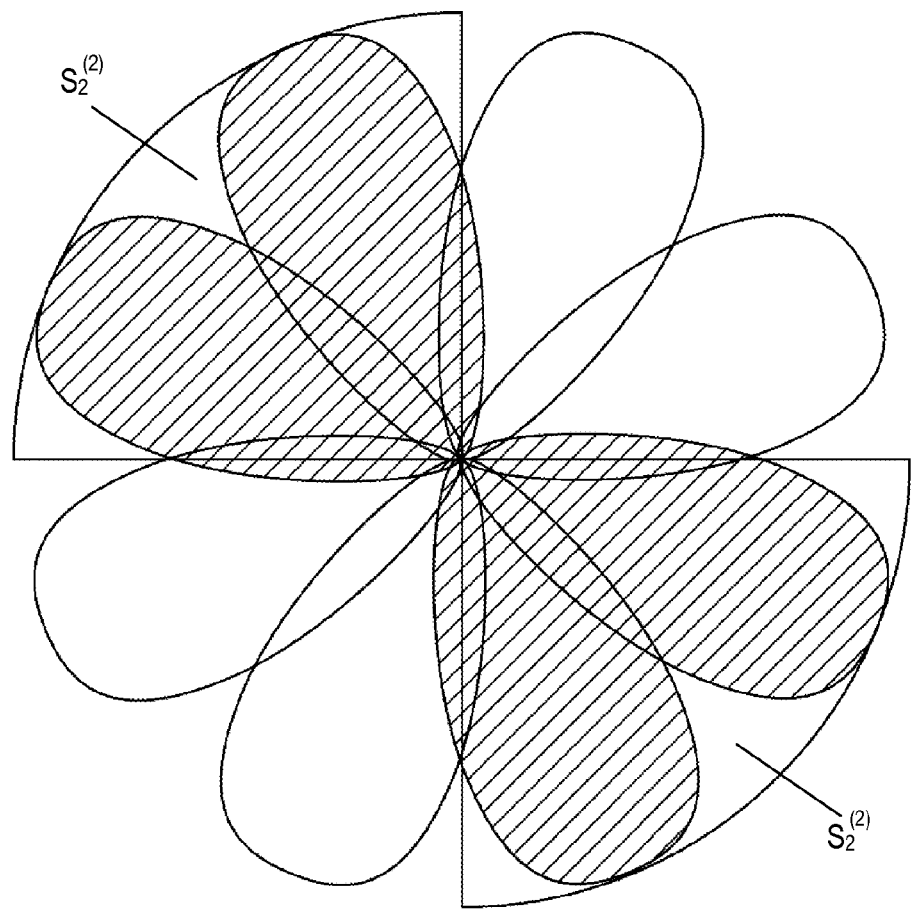

FIGS. 3D and 3E illustrate the scanning beam patterns in the set of scanning beam patterns $P_T^{(2)}$ for the second beam scanning stage. As illustrated in FIG. 3D, the first scanning beam pattern $p_{T,1}^{(2)}$ for the second beam scanning stage is the combination, or union, of the transmit beam patterns 1, 2, 5, and 6. The first scanning beam pattern $p_{T,1}^{(2)}$ for the second beam scanning stage corresponds to the first scanning partition cell $S_1^{(2)}$ in the set of scanning partition cells $Ω^{(2)}$ for the second beam scanning stage. As illustrated in FIG. 3E, the second scanning beam pattern $p_{T,2}^{(2)}$ for the second beam scanning stage is the combination, or union, of the transmit beam patterns 3, 4, 7, and 8. The second beam scanning pattern $p_{T,2}^{(2)}$ for the second beam scanning stage corresponds to the second scanning partition cell $S_2^{(2)}$ in the set of scanning partition cells $Ω^{(2)}$ for the second beam scanning stage. In one embodiment, the index $i_2^*$ is set to 0 if the preferred scanning beam pattern for the second beam scanning stage is the first scanning beam pattern $p_{T,1}^{(2)}$ for the second beam scanning stage and set to 1 if the preferred scanning beam pattern for the second beam scanning stage is the second beam $p_{T,2}^{(2)}$ scanning pattern for the second beam scanning stage.

Figure 3F:
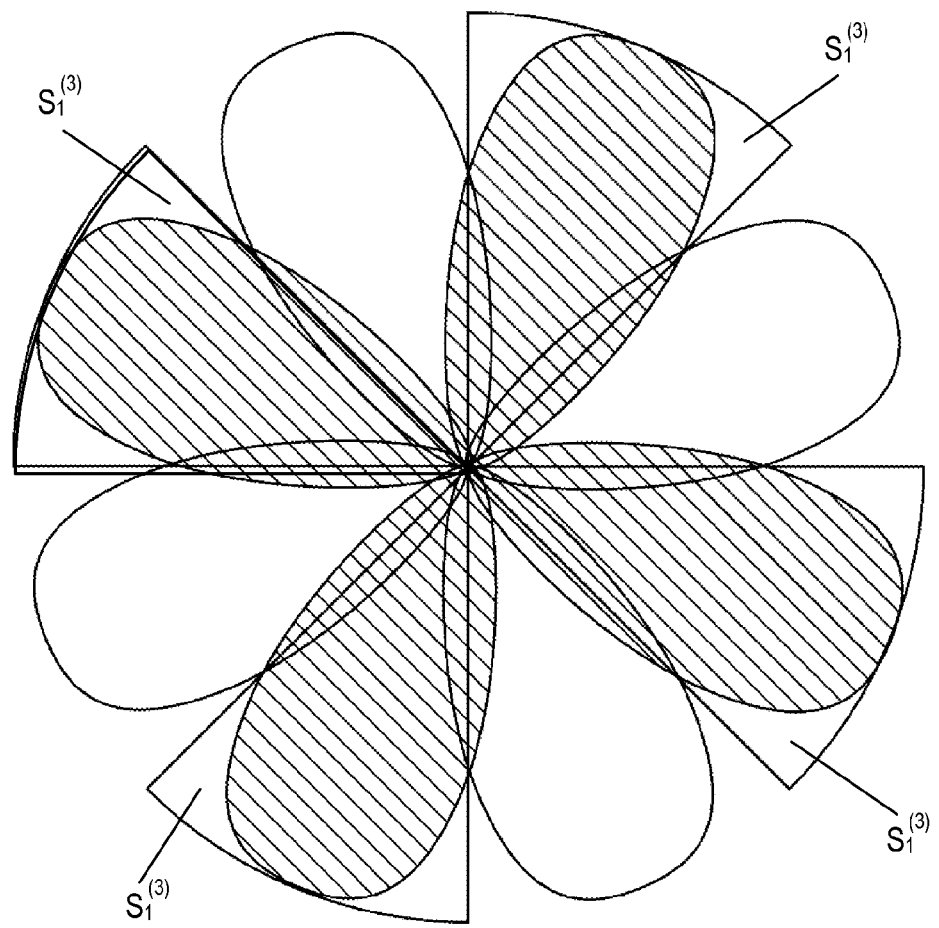
Figure 3G:
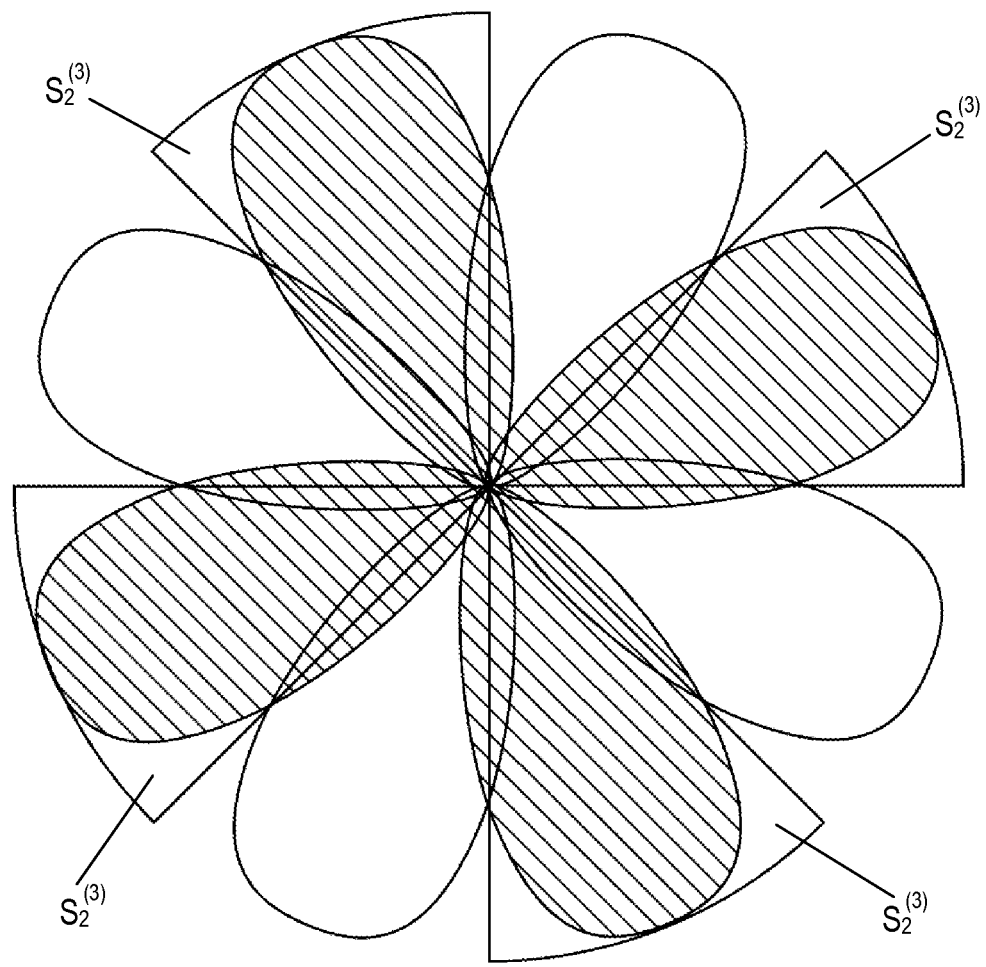

FIGS. 3F and 3G illustrate the scanning beam patterns in the set of scanning beam patterns $P_T^{(3)}$ for the third beam scanning stage. As illustrated in FIG. 3F, the first scanning beam pattern $p_{T,1}^{(3)}$ for the third beam scanning stage is the combination, or union, of the transmit beam patterns 1, 3, 5, and 7. The first scanning beam pattern $p_{T,1}^{(3)}$ for the third beam scanning stage corresponds to the first scanning partition cell $S_1^{(3)}$ in the set of scanning partition cells $Ω^{(3)}$ for the third beam scanning stage. As illustrated in FIG. 3G, the second scanning beam pattern $p_{T,2}^{(3)}$ for the third stage is the combination, or union, of the transmit beam patterns 2, 4, 6, and 8. The second beam scanning pattern $p_{T,2}^{(3)}$ for the third stage corresponds to the second scanning partition cell $S_2^{(3)}$ in the set of scanning partition cells $Ω^{(3)}$ for the third beam scanning stage. In one embodiment, the index $i_3^*$ is set to 0 if the preferred scanning beam pattern for the third beam scanning stage is the first scanning beam pattern $p_{T,1}^{(3)}$ for the third beam scanning stage and set to 1 if the preferred scanning beam pattern for the third beam scanning stage is the second beam scanning pattern $p_{T,2}^{(3)}$ for the third beam scanning stage.

Using the example of FIGS. 3A through 3G, the preferred or best transmit beam pattern for transmission to a receive node (e.g., the receive node 14) can be determined based on the indices ($i_1^*$, $i_2^*$, $i_3^*$) reported by the receive node for the three beam scanning stages based on Table 1 below.

TABLE 1

| ($i_1^*$, $i_2^*$, $i_3^*$) | Selected Transmit Beam |
| --- | --- |
| 000 | 1 |
| 001 | 2 |
| 010 | 3 |
| 011 | 4 |
| 100 | 5 |
| 101 | 6 |
| 110 | 7 |
| 111 | 8 |

Figure 4A:
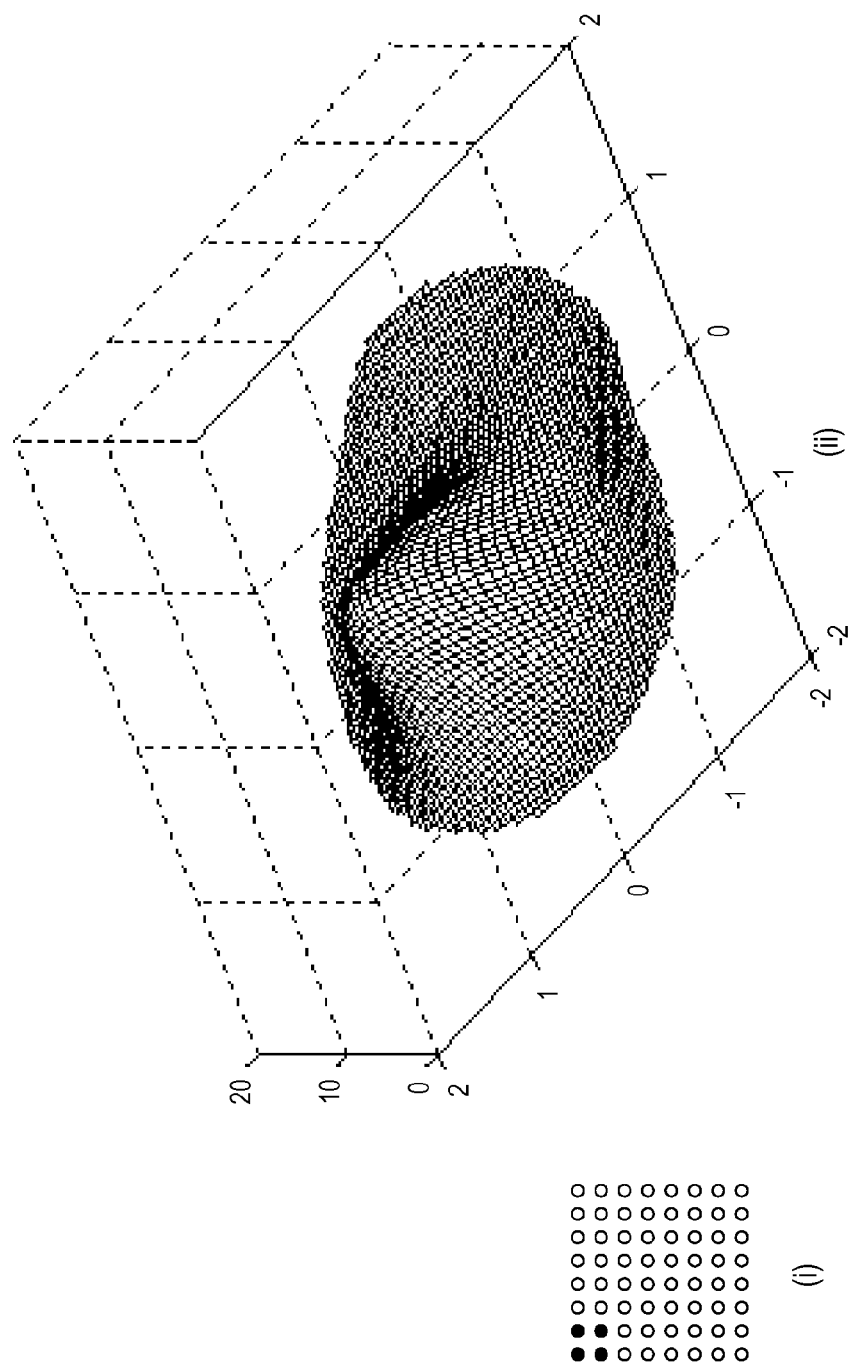
FIGS. 4A through 4C illustrate another example of a set of scanning beam patterns for a multi-stage beam scanning procedure.
Figure 4B:
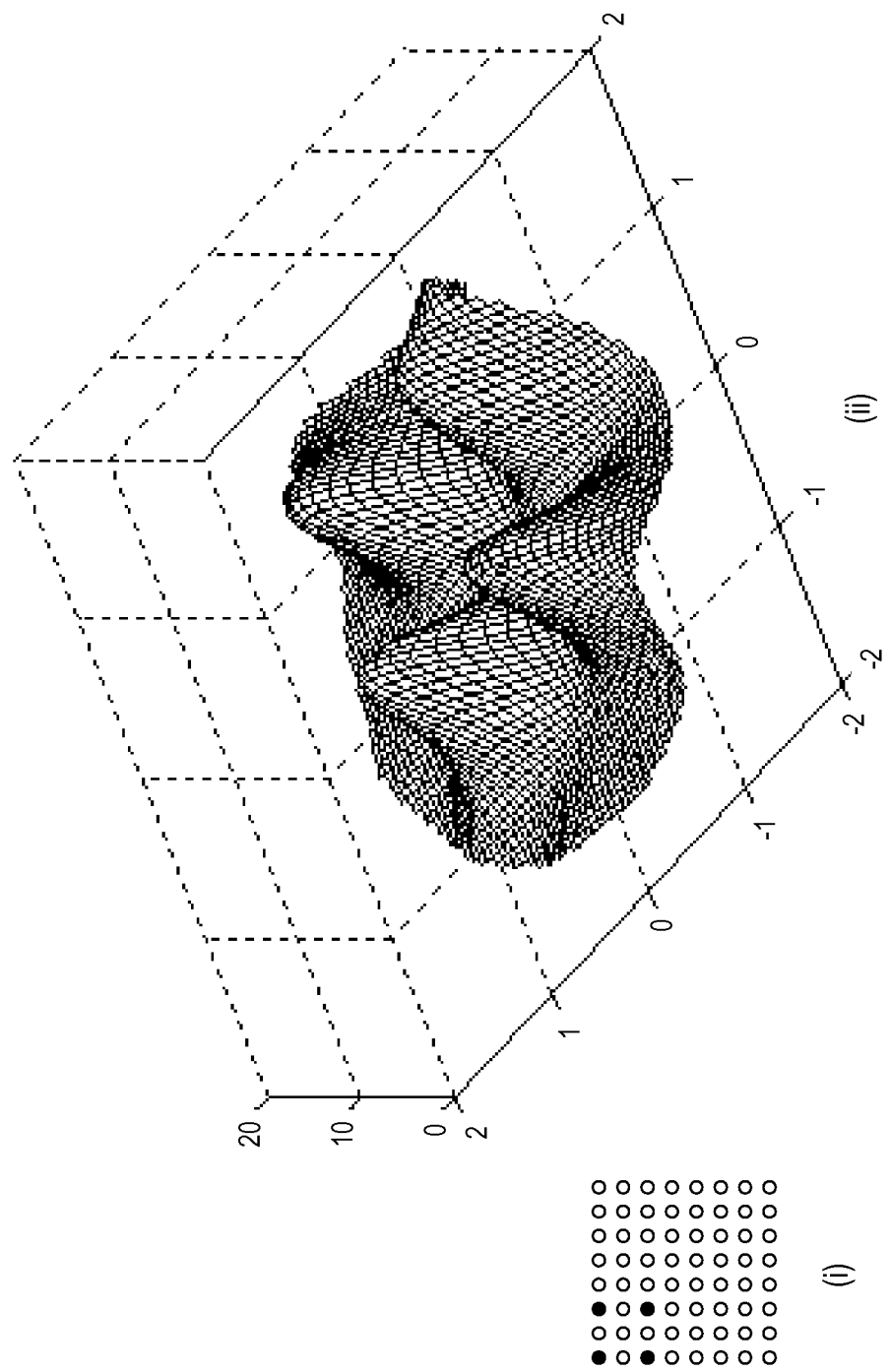
Figure 4C:
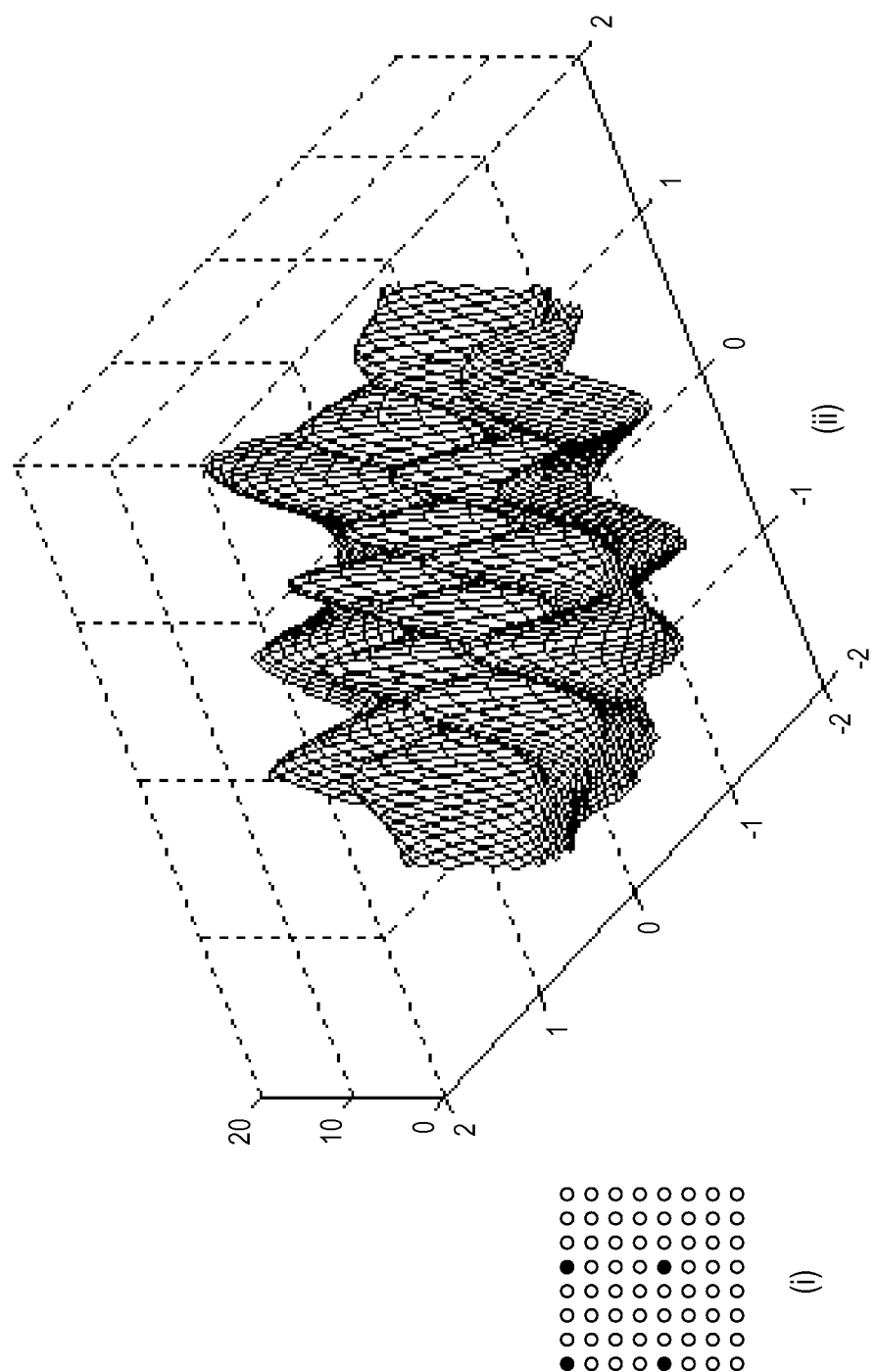

The example of FIGS. 3A through 3G is only one example. FIGS. 4A through 4C illustrate another example of the scanning beam patterns for multiple beam scanning stages. This example illustrates a set of scanning beam patterns for each stage of the multi-stage beam scanning scheme for a two-dimensional antenna array with uniformly spaced antenna elements. Let $n_T=n_{T,a}n_{T,e}$ where $n_{T,a}$ and $n_{T,e}$ denote the number of antenna elements along the two dimensions for steering in azimuth and in elevation, respectively. In this example, only a subset of antennas in each of the two dimensions will be activated in any radio resource slot at any given beam scanning stage, but different subsets are activated at different beam scanning stages. Specifically, a sub-array of $N_1=N_{1,a} \times N_{1,e}$ antennas are activated, where $n_{T,a}$ is assumed to be divisible by $N_{1,a}$, and $n_{T,e}$ is assumed to be divisible by $N_{1,e}$. At different beam scanning stages, these $N_1=N_{1,a}N_{1,e}$ activated antennas are spaced out differently. At the first beam scanning stage, these antennas may be next to each other, and thus forming wide beam patterns.

FIG. 4A illustrates an example of the activated antennas in an 8×8 antenna array and the resulting scanning beam pattern. Different scanning beam patterns in the same stage are merely the same scanning beam pattern pointing at different directions. At the second beam scanning stage, the activated antennas may be two antenna spacings apart, as illustrated in FIG. 4B for the 8×8 array where intentional grating lobes with a narrower beam width are formed. Again, different scanning beam patterns in the same stage are, in this example, the same scanning beam pattern pointing at different directions. Similarly, at the third beam scanning stage, the activated antennas are four antenna spacings apart, as illustrated in FIG. 4C where intentional grating lobes with even narrower beam width are formed.

In this example, there may be 4×4=16 scanning beam patterns in each stage of beam scanning in order to provide an adequate spatial resolution for beam finding. Therefore, for three stages of beam scanning, a total of only 48 resource slots are needed for identifying a total of N=16×16=256 possible beam directions. In contrast, the conventional SBS approach would require 256 resource slots in order to identify the same number of beams.

Note that since in any given resource slot only a small portion of all antenna elements are activated, a different set of antennas may be used to form the beam pattern pointing at the corresponding desired direction if the different resource slots in each stage are divided in the frequency domain. In the typical situation where each antenna has its own power amplifier, this could allow more antennas to contribute power to the overall transmission.

Figure 5:
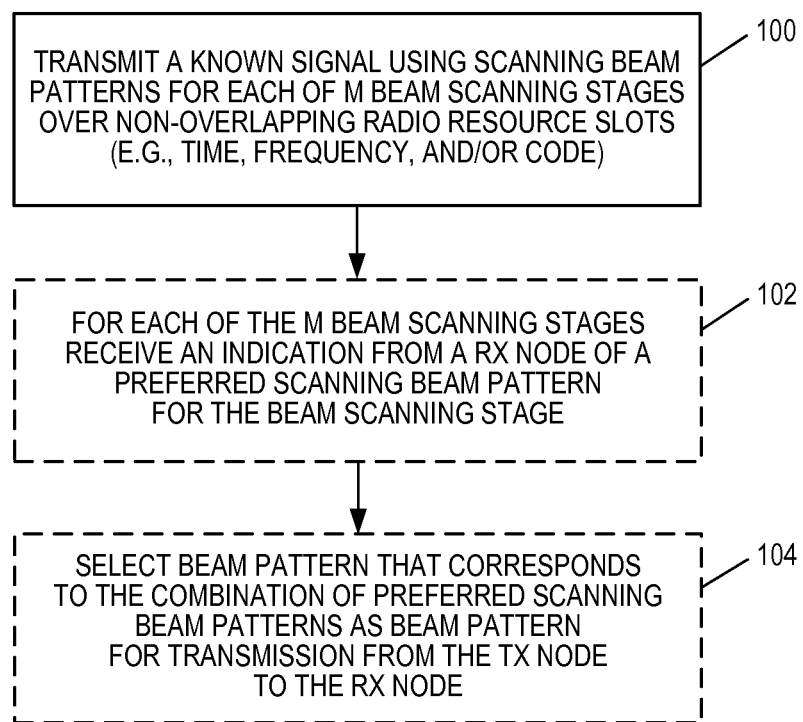
FIG. 5 is a flow chart that illustrates the operation of the transmit node of FIG. 1 to perform a multi-stage beam scanning process according to one embodiment of the present disclosure.

FIG. 5 is a flow chart that illustrates the operation of the transmit node 12 to perform the multi-stage beam scanning process described above according to one embodiment of the present disclosure. The multi-stage beam scanning process is non-adaptive in the sense that the scanning beam patterns for one stage do not depend on feedback from the receive node 14 for the previous stage(s). In some embodiments, the multi-stage beam scanning process is also non-receiver specific in that the same transmissions can be used for identifying the best transmit beam pattern for all receive nodes and is not limited to any particular receive node.

As illustrated, the transmit node 12 transmits a known (e.g., pilot) signal using the scanning beam patterns for each of the M beam scanning stages over non-overlapping radio resource slots (step 100). As used herein, a radio resource slot may be a time-based radio resource slot, a frequency-based radio resource slot, a code-based radio resource slot, or any combination thereof. As discussed above, the scanning beam patterns for the M beam scanning stages are defined such that each unique combination of scanning beam patterns consisting of one scanning beam pattern from each of the M beam scanning stages corresponds to a different one of the N transmit beam patterns of the transmit node 12. More specifically, for each beam scanning stage, the scanning beam patterns for the beam scanning stage partition the service coverage area 18 of the transmit node 12 into a set of scanning partition cells for the beam scanning stage. Each pair of scanning partition cells in the set of scanning partition cells for the for beam scanning stage are disjoint, and the union of the scanning partition cells for the beam scanning stage covers the entire service coverage area 18 of the transmit node 12. The scanning beam patterns for the beam scanning stages are such that, for each unique combination of scanning partition cells consisting of one scanning partition cell from each of the beam scanning stages, an intersection of the unique combination of scanning partition cells corresponds to one of the transmit partition cells 20 of the service coverage area 18 and, thus, one of the transmit beam patterns 16 of the transmit node 12. Note that the number of transmit beam patterns N, the number of beam scanning stages M, and the different sets of scanning beam patterns for the beam scanning stages may be, e.g., pre-defined, programmatically determined by the transmit node 12, or some combination thereof.

The transmit node 12 receives, for each of the M beam scanning stages, an indication from the receive node 14 of the preferred scanning beam pattern for that beam scanning stage (step 102). As discussed above, in some embodiments, the indication of the preferred scanning beam for the mth beam scanning stage is the index $i_m^*$ of the radio resource slot corresponding to the preferred scanning beam pattern for the mth beam scanning stage. The indication of the preferred scanning beam pattern may be fed back to the transmit node 12 individually after each beam scanning stage. Alternatively, the indications of the preferred scanning beam patterns for the M beam scanning stages may be fed back, or reported, to the transmit node 12 together after the last (i.e., the M-th) beam scanning stage.

The transmit node 12 selects the transmit beam pattern of the transmit node 12 that corresponds to the combination of the preferred scanning beam patterns for the M beam scanning stages as the transmit beam pattern for transmission from the transmit node 12 to the receive node 14 (step 104). More specifically, in some embodiments, the indications of the preferred scanning beam patterns are represented as a set of indices $(i_1^*, i_2^*, \ldots, i_M^*)$, and the set of indices is mapped to the corresponding transmit beam pattern via, e.g., a predefined look-up table.

Figure 6:
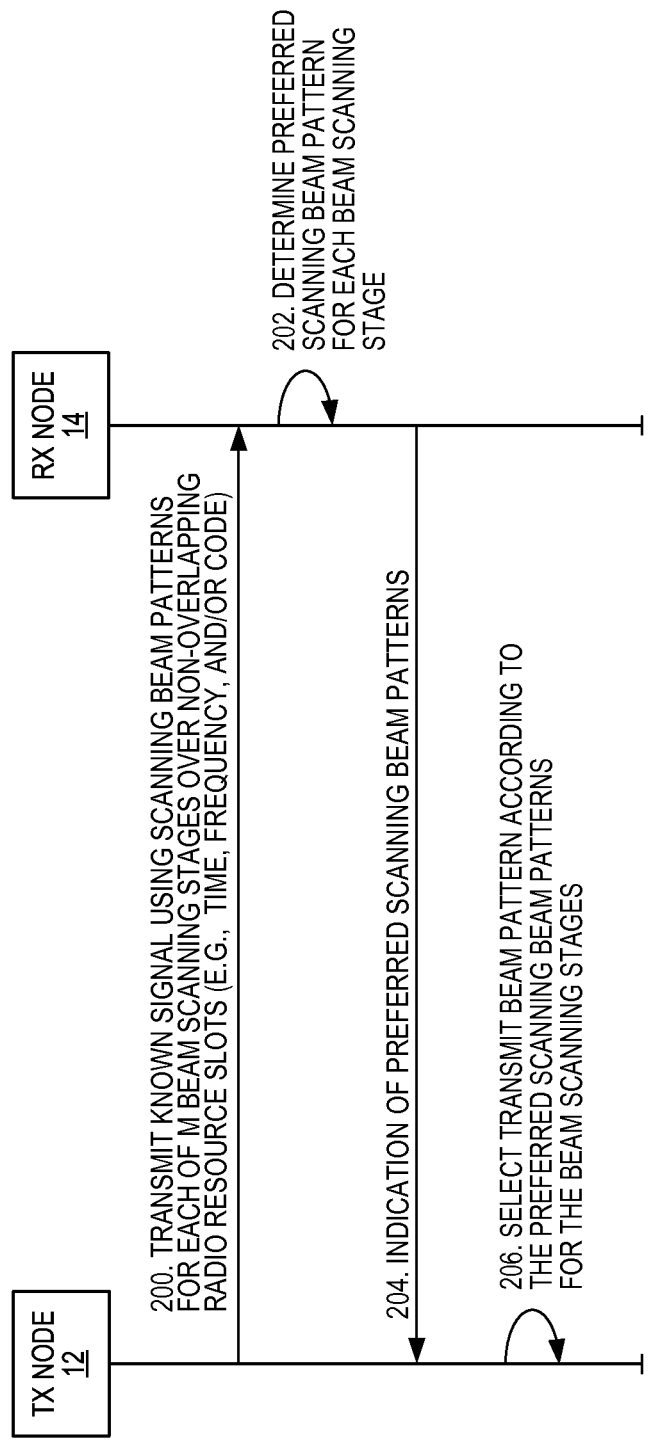
FIG. 6 illustrates the operation of both the transmit node and the receive node of FIG. 1 according to one embodiment of the present disclosure.

While FIG. 5 illustrates the operation of the transmit node 12, FIG. 6 illustrates the operation of both the transmit node 12 and the receive node 14 according to one embodiment of the present disclosure. As illustrated, the transmit node 12 transmits a known (e.g., pilot) signal using the scanning beam patterns for each of the M beam scanning stages over non-overlapping radio resource slots, as discussed above with respect to step 100 of FIG. 5 (step 200). For each beam scanning stage, the receive node 14 determines the preferred scanning beam pattern (step 202). More specifically, as discussed below, the receive node 14 observes the radio resource slots used for the transmission of the known signal by the transmit node 12 for at least some of the radio resource slots for each of the beam scanning stages to thereby determine corresponding values for a link quality metric such as, but not limited to, SNR. For each beam scanning stage, the preferred scanning beam pattern is the scanning beam pattern that corresponds to the radio resource slot having, e.g., the best link quality among all of the radio resource slots for that beam scanning stage or the value for the link quality metric for that beam scanning stage that is better than a predefined threshold.

The receive node 14 transmits, to the transmit node 12, an indication of the preferred scanning beam pattern for each of the beam scanning stages (step 204). As discussed above, the indication of the preferred scanning beam pattern for the mth beam scanning stage may be represented as the index $i_m^*$ of the radio resource slot corresponding to the preferred scanning beam pattern for the mth beam scanning stage. The indication of the preferred scanning beam pattern may be fed back to the transmit node 12 individually after each beam scanning stage. Alternatively, the indications of the preferred scanning beam patterns for the M beam scanning stages may be fed back, or reported, to the transmit node 12 together after the M-th beam scanning stage.

The transmit node 12 selects the transmit beam pattern of the transmit node 12 that corresponds to the combination of the preferred scanning beam patterns for the M beam scanning stages as the transmit beam pattern for transmission from the transmit node 12 to the receive node 14, as discussed above with respect to step 104 of FIG. 5 (step 206). More specifically, in some embodiments, the indications of the preferred scanning beam patterns are represented as a set of indices $(i_1^*, i_2^*, \ldots, i_M^*)$, and the set of indices is mapped to the corresponding transmit beam pattern via, e.g., a predefined look-up table.

Figure 7:
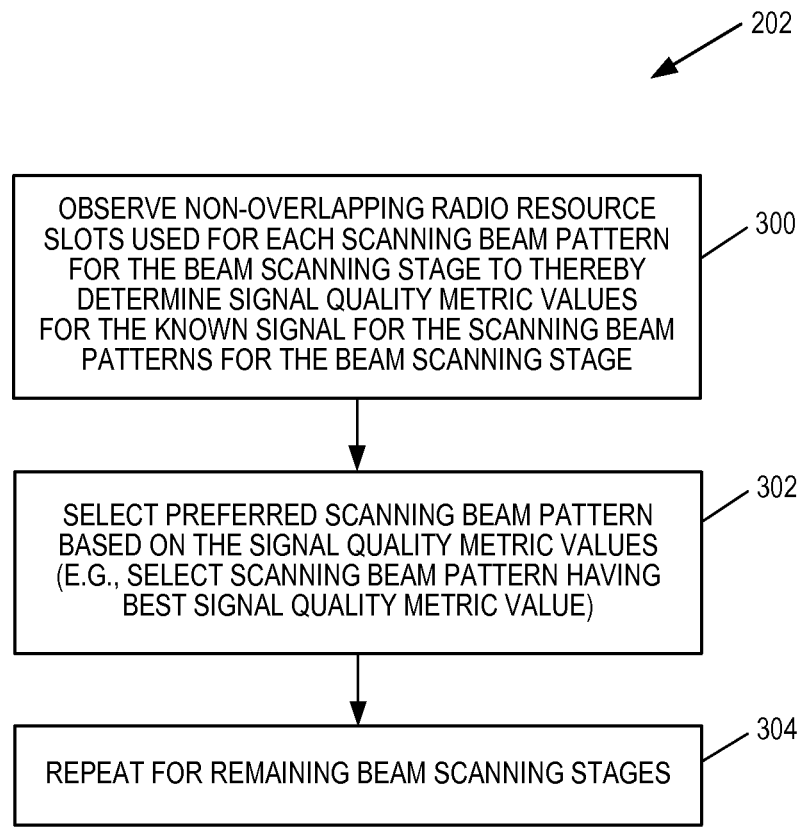
FIG. 7 illustrates the operation of the receive node to select a preferred scanning beam pattern for a beam scanning stage according to one embodiment of the present disclosure.

FIG. 7 illustrates step 202 of FIG. 6 in more detail according to one embodiment of the present disclosure. As illustrated, the receive node 14 observes the non-overlapping radio resource slots used by the transmit node 12 to transmit the known signal using the scanning beam patterns for one of the beam scanning stages to thereby determine signal quality metric values for the known signal for the scanning beam patterns for the beam scanning stage (step 300). More specifically, for each scanning beam pattern of the beam scanning stage, the receive node 14 observes the radio resource slot used by the transmit node 12 to transmit the known signal for that scanning beam pattern for the beam scanning stage to thereby determine a corresponding signal quality metric value. The signal quality metric may be, for example, SNR, and the signal quality metric value is an SNR value. However, signal quality metrics other than SNR may be used. In the same manner, the receive node 14 obtains signal quality metric values for the known signal for each of the scanning beam patterns of the beam scanning stage.

The receive node 14 then selects the preferred scanning beam pattern for the beam scanning stage based on the signal quality metric values (step 302). In one embodiment, the receive node 14 selects the scanning beam pattern corresponding to the best signal quality metric value as the preferred scanning beam pattern for the beam scanning stage. Notably, as discussed above, the receive node 14 does not need to have knowledge of the scanning beam patterns used. For instance, as discussed above, the receive node 14 selects the index of the radio resource slot corresponding to the best signal quality metric value. This index may then be reported to the transmit node 12 as an indication of the preferred beam scanning pattern for the beam scanning stage. This process is repeated for the remaining beam scanning stages (step 304). Note that while "steps" are referred to herein with respect to FIG. 7 (and other flow diagrams), the "steps" may be performed in any suitable order or even at the same time. For example, if the non-overlapping radio resource slots are frequency slots or code slots, steps 300 and 302 may be performed for all of the beam scanning stages in parallel.

Figure 8:
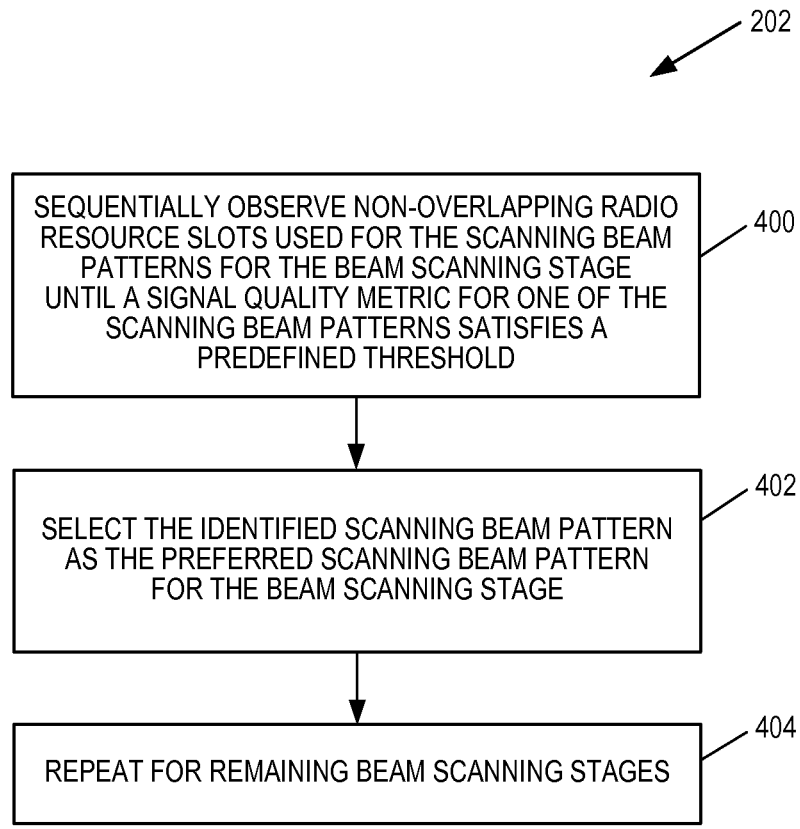
FIG. 8 illustrates the operation of the receive node to select a preferred scanning beam pattern for a beam scanning stage according to another embodiment of the present disclosure.

FIG. 8 illustrates step 202 of FIG. 6 in more detail according to one embodiment of the present disclosure. As illustrated, the receive node 14 sequentially observes the non-overlapping radio resource slots used by the transmit node 12 to transmit the known signal using the scanning beam patterns for one of the beam scanning stages until a signal quality metric for the known signal for one of the scanning beam patterns for the beam scanning stage satisfies a predefined threshold (step 400). More specifically, the receive node 14 observes the radio resource slot for the first scanning beam pattern for the beam scanning stage to determine a signal quality metric value (e.g., a SNR value) for the known signal. The receive node 14 compares the signal quality metric value to the predefined threshold. If the signal quality metric value is better than the predefined threshold, then observation ends. However, if the signal quality metric value is not better than the predefined threshold, then the receive node 14 repeats the process for the radio resource slot for the next scanning beam pattern for the beam scanning stage.

Once observation is complete, the receive node 14 selects the scanning beam pattern identified by the observation of step 400 as the preferred scanning beam pattern for the beam scanning stage (step 402). As discussed above, the receive node 14 does not need to have knowledge of the scanning beam patterns used. For instance, as discussed above, the receive node 14 selects the index of the radio resource slot corresponding to the first signal quality metric value that is better than the predefined threshold. This index may then be reported to the transmit node 12 as an indication of the preferred beam scanning pattern for the beam scanning stage. The process of steps 400 and 402 is repeated for the remaining beam scanning stages (step 404).

Figure 9:
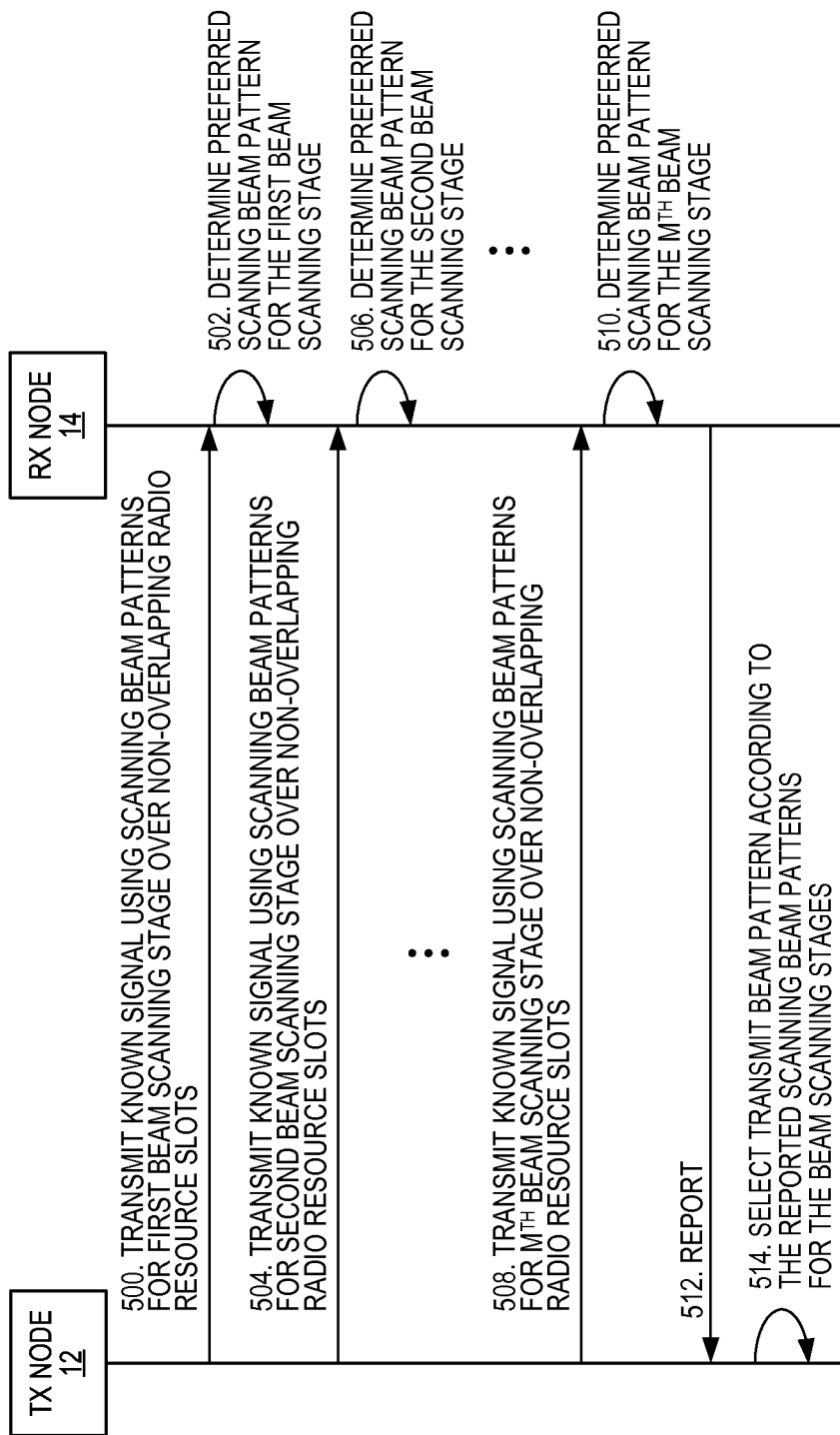
FIG. 9 illustrates the operation of the transmit node and the receive node according to one example in which the non-overlapping radio resource slots are non-overlapping time slots.

As discussed above, the radio resource slots used for transmission of the known signal for the scanning beam patterns for the beam scanning stages are non-overlapping radio resource slots. FIG. 9 illustrates one example in which the non-overlapping radio resource slots are non-overlapping time slots. However, this is only an example. The non-overlapping radio resource slots may be non-overlapping time slots, non-overlapping frequency slots, non-overlapping codes (referred to herein as code slots), or any combination thereof. Further, some mixture of non-overlapping radio resource slot types may be used. For example, different time slots may be used for different stages, but different frequency slots may be used for the different scanning beam patterns within the same stage.

As illustrated in FIG. 9, in this example, the transmit node 12 transmits a known (e.g., pilot) signal using the scanning beam patterns for a first beam scanning stage over non-overlapping radio resource slots (step 500). In one embodiment, the non-overlapping radio resource slots are non-overlapping time slots, and the transmit node 12 transmits the known signal using the scanning beam patterns for the first beam scanning stage over the non-overlapping time slots in a sequential order. This is referred to herein as per-stage SBS.

The receive node 14 determines the preferred scanning beam pattern for the first beam scanning stage (step 502). More specifically, as discussed above, the receive node 14 observes the radio resource slots used for the transmission of the known signal by the transmit node 12 for at least some of the scanning beam patterns for the beam scanning stages to thereby determine corresponding values for a link quality metric such as, but not limited to, SNR. In one embodiment, the preferred scanning beam pattern for the first beam scanning stage is the scanning beam pattern that corresponds to the radio resource slot having the best link quality among all of the radio resource slots for the first beam scanning stage. In another embodiment, the preferred scanning beam pattern for the first beam scanning stage is the scanning beam pattern that corresponds to the first radio resource slot for the first stage having a signal, or link, quality that is better than a predefined threshold.

In the same manner, the transmit node 12 transmits a known (e.g., pilot) signal using the scanning beam patterns for a second beam scanning stage over non-overlapping radio resource slots (step 504). The receive node 14 determines the preferred scanning beam pattern for the second beam scanning stage (step 506). This process continues until the transmit node 12 transmits a known (e.g., pilot) signal using the scanning beam patterns for the M-th beam scanning stage over non-overlapping radio resource slots (step 508), and the receive node 14 determines the preferred scanning beam pattern for the M-th beam scanning stage (step 510).

As discussed above, the scanning beam patterns for the M beam scanning stages are defined such that each unique combination of scanning beam patterns consisting of one scanning beam pattern from each of the M beam scanning stages corresponds to a different transmit beam pattern of the transmit node 12. More specifically, for each beam scanning stage, the scanning beam patterns for the beam scanning stage partition the service coverage area 18 of the transmit node 12 into a set of scanning partition cells for the beam scanning stage. Each pair of scanning partition cells in the set of scanning partition cells for the for beam scanning stage are disjoint, and the union of the partition cells for the beam scanning stage cover the entire service coverage area 18 of the transmit node 12. The scanning beam patterns for the beam scanning stages are such that, for each unique combination of scanning partition cells consisting of one scanning partition cell from each of the beam scanning stages, an intersection of the unique combination of scanning partition cells corresponds to one of the transmit partition cells 20 of the service coverage area 18 and, thus, one of the transmit beam patterns 16 of the transmit node 12.

In this embodiment, after the receive node 14 has selected the preferred scanning beam patterns for all M beam scanning stages, the receive node 14 transmits, to the transmit node 12, a report including an indication of the preferred scanning beam pattern for each of the beam scanning stages (step 512). As discussed above, the indication of the preferred scanning beam for the mth beam scanning stage may be represented as the index $i_m^*$ of the radio resource slot corresponding to the preferred scanning beam pattern for the mth beam scanning stage. Alternatively, the indications of the preferred scanning beam patterns for the beam scanning M stages may be fed back, or reported, to the transmit node 12 together after the M-th beam scanning stage.

The transmit node 12 selects the transmit beam pattern of the transmit node 12 that corresponds to the combination of the preferred scanning beam patterns for the M beam scanning stages as the transmit beam pattern for transmission from the transmit node 12 to the receive node 14, as discussed above with respect to step 104 of FIG. 5 (step 514). More specifically, in some embodiments, the indications of the preferred scanning beam patterns are represented as a set of indices, and the set of indices is mapped to the corresponding transmit beam pattern via, e.g., a predefined look-up table.

Figure 10:
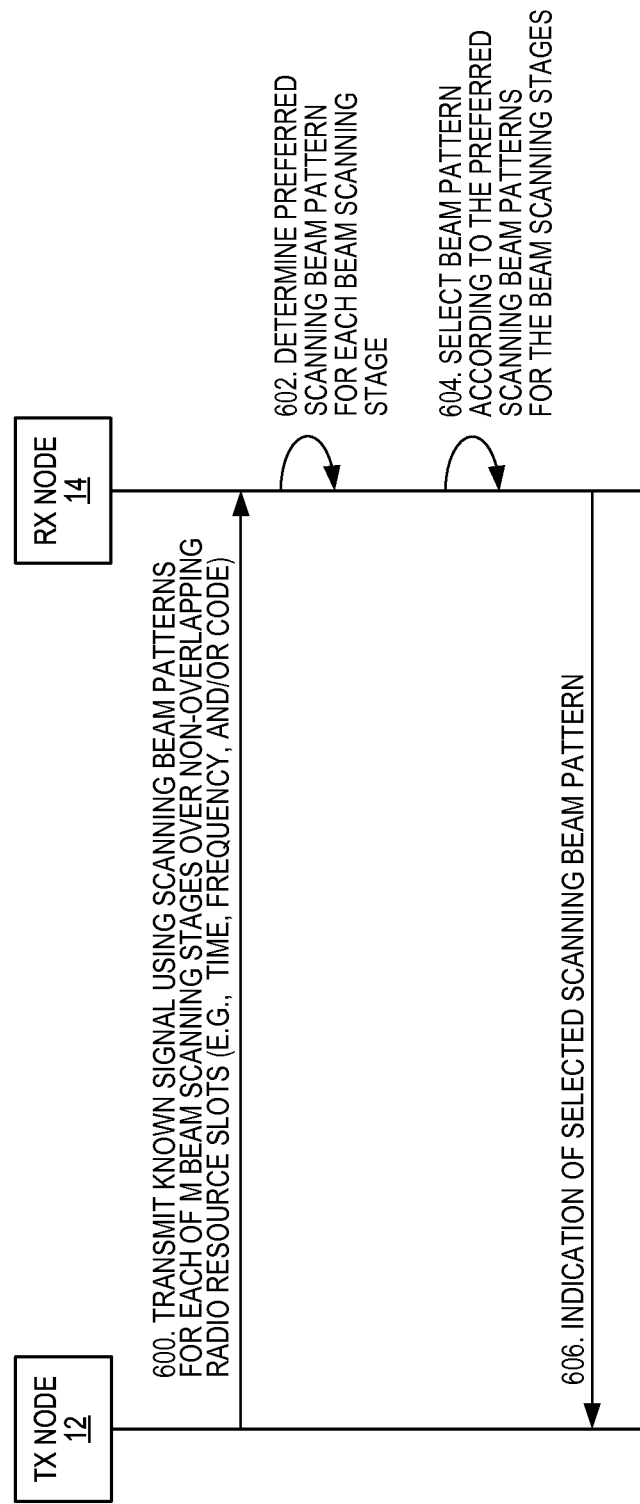
FIG. 10 illustrates the operation of the transmit node and the receive node according to another embodiment of the present disclosure.

In the embodiments described thus far, the receive node 14 provides feedback to the transmit node 12, and the transmit node 12 then selects the best transmit beam pattern 16 based on the feedback from the receive node 14. However, in some embodiments, the receive node 14 may have knowledge of the transmit beam patterns 16 and select the best or preferred transmit beam pattern 16 based on the preferred scanning beam patterns for the M beam scanning stages. In this regard, FIG. 10 illustrates the operation of both the transmit node 12 and the receive node 14 according to another embodiment of the present disclosure. As illustrated, the transmit node 12 transmits a known (e.g., pilot) signal using the scanning beam patterns for each of the M beam scanning stages over non-overlapping radio resource slots, as discussed above with respect to step 100 of FIG. 5 (step 600). For each beam scanning stage, the receive node 14 determines the preferred scanning beam pattern, as discussed above (step 602). However, in this embodiment, the receive node selects the transmit beam pattern 16 for transmission from the transmit node 12 to the receive node 14 according to the preferred scanning beam patterns for the beam scanning stages (step 604). More specifically, in some embodiments, the indications of the preferred scanning beam patterns are represented as a set of indices $(i_1^*, i_2^*, \ldots, i_M^*)$, and the set of indices is mapped to the corresponding transmit beam pattern via, e.g., a predefined look-up table stored at the receive node 14. This look-up table may be preconfigured at the receive node 14 or configured by, e.g., the transmit node 12 or wireless network. The receive node 14 transmits, to the transmit node 12, an indication of the selected scanning beam pattern for each of the beam scanning stages (step 606).

The multi-stage beam scanning approach described herein provides an exponentially more efficient method for non-device specific beam finding than the conventional SBS approach with essentially the same feedback requirement. Specifically, for a total of N possible beam directions, where N can be factorized as $N=N_1^M$, the multi-stage beam scanning approach requires only $N_1 \log_{N_1} N = N_1 M$ resource slots for transmitting pilot signals, as opposed to N resource slots required by SBS.

FIG. 11 compares the performance of the conventional SBS and one embodiment of the multi-stage beam scanning approach disclosed herein. Each dot on the graph corresponds to a random realization of channel response generated based on a ray-tracing model in an indoor floor plan. The x-coordinate of each dot represents the ideal SNR level achievable using eigen-beamforming from a transmitter to a receiver assuming a perfect knowledge of the channel response at the transmitter, while the y-coordinate represents the actual SNR level achievable using the beam found by the corresponding beam scanning method. The curves shown correspond to a histogram of the dots with 2 decibel (dB) bin-width. As shown in FIG. 11, the multi-stage beam scanning approach performs comparably with the conventional SBS albeit using much less radio resources.

FIG. 12 shows a similar comparison based on data throughput instead of SNR. In this plot, the y-coordinate represents the ratio between the actual throughput achievable by the beam found using the corresponding beam scanning scheme and the ideal throughput achievable by eigen-beamforming assuming channel knowledge at the transmitter. As shown in FIG. 12, the multi-stage beam scanning approach performs comparably with the conventional SBS albeit using much less radio resources.

The discussion above has focused on the transmit node 12 and the receive node 14, which may be implemented in any type of wireless communication system. FIG. 13 illustrates one particular embodiment in which the transmit node 12 and the receive node 14 are implemented in a cellular communications network 22. In this particular embodiment, the transmit node 12 is a base station 24 in a Radio Access Network (RAN) of the cellular communications network 22, and the receive node 14 is a wireless device 26. Note that the base station 24 is only an example of the transmit node 12. The transmit node 12 may be implemented in another type of radio access node (e.g., a Remote Radio Head (RRH)) or implemented in a wireless device. Likewise, the wireless device 26 is only an example of the receive node 14. The receive node 14 may be implemented in, e.g., a radio access node with the transmit node 12 then being implemented in a wireless device. In the example of FIG. 13, the base station 24 utilizes the multi-stage beam scanning approach described above to identify the best or preferred beam patterns to use for transmissions to the wireless devices 26. However, in the same manner, the wireless device 26 may operate as the transmit node 12 and perform the multi-stage beam scanning procedure to identify the best or preferred beam pattern to use for transmission to the base station 24.

FIG. 14 is a block diagram of the transmit node 12 according to one embodiment of the present disclosure. As discussed above, in one embodiment, the transmit node 12 is the base station 24, or similar radio access node, in the cellular communications network 22. As illustrated, the transmit node 12 includes one or more processors 28 (e.g., Central Processing Units (CPUs)), memory 30, one or more signal processors 32, a wireless transceiver 34 including a transmitter 36 and a receiver 38 coupled to multiple antennas 40. The signal processor(s) 32 includes an encoder 41, a modulator 42, and a precoder 44. The encoder 41 performs encoding of an input signal of the signal processor(s) 32 (e.g., encoding of information bits into coded bits for, e.g., error protection). The modulator 42 modulates the encoded signal (e.g., performs Orthogonal Frequency Division Multiplexing (OFDM) or similar modulation) to provide a modulated signal. The precoder 44 operates to perform beamforming by applying a beamforming vector to the modulated signal from the modulator 42. The beamforming vector may also be referred to as a precoding matrix. The transmitter 36 then processes the output signal from the signal processor(s) 32 (e.g., upconverts, amplifies, and filters the modulated signal) to thereby output appropriate transmit signals to the antennas 40. With respect to the receive path, the signal processor(s) 32 include a demodulator 46 and, in some embodiments, a decoder 48.

In operation, in some embodiments, the processor(s) 28 perform the multi-stage beam scanning procedure described above by controlling the signal processor(s) 32 to transmit a pilot signal using the scanning beam patterns for the M beam scanning stages, as described above. This may be done by configuring the precoder 44 and providing a baseband representation of the desired pilot signal to the input of the signal processor(s) 32. Further, in some embodiments, the signal processor(s) 32 receive an indication of the preferred scanning beam pattern for each beam scanning stage from the receive node 14 via the receiver 38 and the signal processor(s) 32. The signal processor(s) 32 can then select the best or preferred transmit beam pattern for transmission to the receive node 14 based on the feedback from the receive node 14, as described above.

In some embodiments, the functionality of the transmit node 12 is implemented in software and stored in the memory 30 for execution by the processor(s) 28. By executing this software, the transmit node 12 operates according to any of the embodiments described above.

In some embodiments, a computer program including instructions which, when executed by at least one processor (e.g., the processor(s) 28), cause the at least one processor to carry out the functionality of the transmit node 12 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 30).

FIG. 15 is a block diagram of the receive node 14 according to one embodiment of the present disclosure. As discussed above, in one embodiment, the receive node 14 is the wireless device 26 in the cellular communications network 22. As illustrated, the receive node 14 includes one or more processors 50 (e.g., CPUs), memory 52, one or more signal processors 54, a wireless transceiver 56 including a receiver 58 and a transmitter 60 coupled to one or more antennas 62. For the receive path, the receiver 58 processes a received signal (e.g., amplifies, downconverts, filters, and analog-to-digital converts) to provide a digital representation of the received signal. The signal processor(s) 54 include a demodulator 64 and, in some embodiments, a decoder 66. The demodulator 64 operates to demodulate the digital representation of the received signal (e.g., perform OFDM demodulation). The decoder 66 may, for example, operate to decode the demodulated signal in the case where multiple ranks, or transmission streams, were transmitted by the transmit node 12. The transmit path includes an encoder 67, a modulator 68, a precoder 70 (optional), and the transmitter 60.

In operation, in some embodiments, the processor(s) 50 observe the baseband representation of the receive signal during the radio resource slots used for the scanning beam patterns of the beam scanning stage to thereby determine or select the preferred scanning beam pattern for each stage. In some embodiments, the processor(s) 50 feed back an indication of the preferred scanning beam patterns for the beam scanning stages to the transmit node 12 via the signal processor(s) 54 and the transmitter 60. In other embodiments, the processor(s) 50 select the best or preferred transmit beam pattern 16 based on the preferred scanning beam patterns for the beam scanning stages and transmits an indication of the selected transmit beam pattern to the transmit node 12 via the signal processor(s) 54 and the transmitter 60.

In some embodiments, the functionality of the receive node 14 is implemented in software and stored in the memory 52 for execution by the processor(s) 50. By executing this software, the receive node 14 operates according to any of the embodiments described above.

In some embodiments, a computer program including instructions which, when executed by at least one processor (e.g., the processor(s) 50), cause the at least one processor to carry out the functionality of the receive node 14 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 52).

FIG. 16 illustrates the transmit node 12 according to another embodiment of the present disclosure. In this embodiment, the transmit mode 12 includes a scanning beam transmission module 72 and, in some embodiments, a reception module 74 and a transmit beam pattern selection module 76, each of which are implemented in software. The scanning beam transmission module 72 operates to cause transmission of a known signal (e.g., a pilot signal) using the scanning beam patterns of the beam scanning stages via an associated transmitter. The reception module 74 operates to, in some embodiments, receive an indication of the preferred scanning beam patterns for the beam scanning stages from the receive node 14 via an associated receiver. The transmit beam selection module 76 selects the best or preferred transmit beam pattern 16 according to the preferred scanning beam patterns for the beam scanning stages indicated by the transmit node 12, as discussed above. In other embodiments, the reception module 74 receives, via an associated receiver, an indication of the best or preferred transmit beam pattern from the receive node 14.

FIG. 17 illustrates the receive node 14 according to another embodiment of the present disclosure. In this embodiment, the receive node 14 includes a preferred scanning beam pattern determination module 78, a reporting module 80, and, in some embodiments, a selection module 82, each of which are implemented in software. The preferred scanning beam pattern determination module 78 operates to observe the radio resource slots used for transmission of the known signal using the scanning beam patterns for the beam scanning stages to determine a preferred scanning beam pattern for each beam scanning stage, as described above. In some embodiments, the reporting module 80 reports an indication of the preferred scanning beam pattern for each beam scanning stage. In other embodiments, the selection module 82 selects the best or preferred transmit beam according to the preferred scanning beam patterns for the beam scanning stages, in which case the reporting module 80 then reports an indication of the selected transmit beam pattern.

The following acronyms are used throughout this disclosure.

3GPP 3$^{rd}$ Generation Partnership Project
AN Access Node
BF Beamforming
BMR Beam Measurement Report
CPU Central Processing Unit
dB Decibel
GHz Gigahertz
LTE Long Term Evolution mmW Millimeter Wave
OFDM Orthogonal Frequency Division Multiplexing
RAN Radio Access Network
RRH Remote Radio Head
SBS Sequential Beam Sweeping
SNR Signal-to-Noise Ratio
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a transmit node to perform non-adaptive beam scanning for a plurality of transmit beam patterns of the transmit node, comprising:
   transmitting a known signal using each of a plurality of scanning beam patterns for each of a plurality of beam scanning stages over non-overlapping radio resource slots in a non-adaptive manner such that the plurality of scanning beam patterns used to perform non-adaptive beam scanning are independent of feedback from a receive node during the non-adaptive beam scanning procedure;
   wherein the plurality of scanning beam patterns for the plurality of beam scanning stages are such that each unique combination of scanning beam patterns consisting of one scanning beam pattern from each of the plurality of beam scanning stages corresponds to a different transmit beam pattern of the plurality of transmit beam patterns of the transmit node that partition a service coverage area of the transmit node into a plurality of transmit partition cells.

2. A transmit node enabled to perform non-adaptive beam scanning for a plurality of transmit beam patterns of the transmit node, comprising:
   a transceiver comprising a transmitter and a receiver coupled to a plurality of antennas; and
   at least one processor configured to:
      transmit, via the transmitter, a known signal using each of a plurality of scanning beam patterns for each of a plurality of beam scanning stages over non-overlapping radio resource slots in a non-adaptive manner such that the plurality of scanning beam patterns used to perform non-adaptive beam scanning are independent of feedback from a receive node during the non-adaptive beam scanning procedure;
   wherein the plurality of scanning beam patterns for the plurality of beam scanning stages are such that each unique combination of scanning beam patterns consisting of one scanning beam pattern from each of the plurality of beam scanning stages corresponds to a different transmit beam pattern of the plurality of transmit beam patterns of the transmit node that partition a service coverage area of the transmit node into a plurality of transmit partition cells.

3. The transmit node of claim 2 wherein:
   for each beam scanning stage of the plurality of beam scanning stages, the plurality of scanning beam patterns for the beam scanning stage partition the service coverage area of the transmit node into a set of scanning partition cells for the beam scanning stage such that each pair of scanning partition cells in the set of scanning partition cells for the beam scanning stage are disjoint and the union of the scanning partition cells in the set of scanning partition cells for the beam scanning stage cover the entire service coverage area of the transmit node; and
   the plurality of scanning beam patterns for the plurality of beam scanning stages are such that, for each unique combination of scanning partition cells consisting of one scanning partition cell from each of the plurality of beam scanning stages, an intersection of the unique combination of scanning partition cells corresponds to a different one of the plurality of transmit partition cells of the service coverage area of the transmit node and thus a different transmit beam pattern of the plurality of transmit beam patterns of the transmit node.

4. A method of operation of a receive node to provide feedback to assist in non-adaptive beam scanning by a transmit node to select a transmit beam pattern from a plurality of transmit beam patterns of the transmit node, comprising:
   determining a preferred scanning beam pattern from a plurality of scanning beam patterns transmitted in a non-adaptive manner for each of a plurality of beam scanning stages such that the plurality of scanning beam patterns used to perform non-adaptive beam scanning are independent of feedback from the receive node during the non-adaptive beam scanning procedure and where the plurality of transmit beam patterns of the transmit node partition a service coverage area of the transmit node into a plurality of transmit partition cells; and
   sending, to the transmit node, an indication of the preferred scanning beam pattern for each of the plurality of beam scanning stages.

5. A receive node enabled to provide feedback to assist in non-adaptive beam scanning by a transmit node to select a transmit beam pattern from a plurality of transmit beam patterns of the transmit node, comprising:
   a wireless transceiver comprising a transmitter and a receiver coupled to a plurality of antennas; and
   at least one processor configured to:
      determine a preferred scanning beam pattern from a plurality of scanning beam patterns transmitted in a non-adaptive manner for each of a plurality of beam scanning stages such that the plurality of scanning beam patterns used to perform non-adaptive beam scanning are independent of feedback from the receive node during the non-adaptive beam scanning procedure and where the plurality of transmit beam patterns of the transmit node partition a service coverage area of the transmit node into a plurality of transmit partition cells; and
      send, to the transmit node via the transmitter, an indication of the preferred scanning beam pattern for each of the plurality of beam scanning stages.

6. A system enabling performance of non-adaptive beam scanning for a plurality of transmit beam patterns of a transmit node, comprising:
   the transmit node configured to:
      transmit a known signal using each of a plurality of scanning beam patterns for each of a plurality of beam scanning stages over non-overlapping radio resource slots transmitted in a non-adaptive manner such that the plurality of scanning beam patterns used to perform non-adaptive beam scanning are independent of feedback from a receive node during the non-adaptive beam scanning procedure;
   wherein the plurality of scanning beam patterns for the plurality of beam scanning stages are such that each unique combination of scanning beam patterns consisting of one scanning beam pattern from each of the plurality of beam scanning stages corresponds to a different transmit beam pattern of the plurality of transmit beam patterns of the transmit node that partition a service coverage area of the transmit node into a plurality of transmit partition cells; and the receive node configured to:
determine a preferred scanning beam pattern from the plurality of scanning beam patterns for each of the plurality of beam scanning stages based on the transmission of the known signal using the plurality of scanning beam patterns for each of the plurality of beam scanning stages.

7. A method of operation of a receive node to provide feedback to assist in non-adaptive beam scanning and selection by a transmit node to select a transmit beam pattern from a plurality of transmit beam patterns of the transmit node, comprising:

determining a preferred scanning beam pattern from a plurality of scanning beam patterns transmitted in a non-adaptive manner for each of a plurality of beam scanning stages such that the plurality of scanning beam patterns used to perform non-adaptive beam scanning are independent of feedback from the receive node during the non-adaptive beam scanning procedure and where the plurality of transmit beam patterns of the transmit node partition a service coverage area of the transmit node into a plurality of transmit partition cells, wherein the plurality of scanning beam patterns for the plurality of beam scanning stages are such that each unique combination of scanning beam patterns consisting of one scanning beam pattern from each of the plurality of beam scanning stages corresponds to a different transmit beam pattern of the plurality of transmit beam patterns of the transmit node;

selecting one of the plurality of transmit beam patterns for the transmit node that corresponds to a combination of the preferred scanning beam patterns for the plurality of beam scanning stages as a selected transmit beam pattern for transmission from the transmit node to the receive node; and transmitting an indication of the selected transmit beam pattern to the transmit node.

8. A transmit node enabled to perform non-adaptive beam scanning for a plurality of transmit beam patterns of the transmit node, comprising:

a transceiver comprising a transmitter and a receiver coupled to a plurality of antennas; and at least one processor configured to:
transmit, via the transmitter, a known signal using each of a plurality of scanning beam patterns for each of a plurality of beam scanning stages over non-overlapping radio resource slots in a non-adaptive manner such that the plurality of scanning beam patterns used to perform non-adaptive beam scanning are independent of feedback from a receive node during the non-adaptive beam scanning procedure;

wherein the plurality of scanning beam patterns for the plurality of beam scanning stages are such that each unique combination of scanning beam patterns consisting of one scanning beam pattern from each of the plurality of beam scanning stages corresponds to a different transmit beam pattern of the plurality of transmit beam patterns of the transmit node that partition a service coverage area of the transmit node into a plurality of transmit partition cells.

9. The transmit node of claim 8 wherein:
for each beam scanning stage of the plurality of beam scanning stages, the plurality of scanning beam patterns for the beam scanning stage partition the service coverage area of the transmit node into a set of scanning partition cells for the beam scanning stage such that each pair of scanning partition cells in the set of scanning partition cells for the beam scanning stage are disjoint and the union of the scanning partition cells in the set of scanning partition cells for the beam scanning stage cover the entire service coverage area of the transmit node; and the plurality of scanning beam patterns for the plurality of beam scanning stages are such that, for each unique combination of scanning partition cells consisting of one scanning partition cell from each of the plurality of beam scanning stages, an intersection of the unique combination of scanning partition cells corresponds to a different one of the plurality of transmit partition cells of the service coverage area of the transmit node and thus a different transmit beam pattern of the plurality of transmit beam patterns of the transmit node.

10. The transmit node of claim 8 wherein the at least one processor is further configured to:
receive, via the receiver, an indication from a receive node of a preferred scanning beam pattern of the plurality of scanning beam patterns for each of the plurality of beam scanning stages; and select one of the plurality of transmit beam patterns for the transmit node that corresponds to a combination of preferred scanning beam patterns indicated by the receive node as a transmit beam pattern for transmission from the transmit node to the receive node.

11. The transmit node of claim 8 wherein the non-overlapping radio resource slots comprise at least one of a group consisting of: non-overlapping time resources, non-overlapping frequency resources, and non-overlapping code resources.

12. A method of operation of a receive node to provide feedback to assist in non-adaptive beam scanning by a transmit node to select a transmit beam pattern from a plurality of transmit beam patterns of the transmit node, comprising:

determining a preferred scanning beam pattern from a plurality of scanning beam patterns transmitted in a non-adaptive manner for each of a plurality of beam scanning stages such that the plurality of scanning beam patterns used to perform non-adaptive beam scanning are independent of feedback from the receive node during the non-adaptive beam scanning procedure and where the plurality of transmit beam patterns of the transmit node partition a service coverage area of the transmit node into a plurality of transmit partition cells; and sending, to the transmit node, an indication of the preferred scanning beam pattern for each of the plurality of beam scanning stages.

13. The method of claim 12 wherein the plurality of scanning beam patterns for the plurality of beam scanning stages are such that each unique combination of scanning beam patterns consisting of one scanning beam pattern from each of the plurality of beam scanning stages corresponds to a different transmit beam pattern of the plurality of transmit beam patterns of the transmit node.

14. The method of claim 12 wherein determining the preferred scanning beam pattern for each of the plurality of beam scanning stages comprises, for each beam scanning stage:
- sequentially observing non-overlapping radio resource slots used by the transmit node for transmission of a known signal using each of the plurality of scanning beam patterns for the beam scanning stage until a signal quality metric value for the known signal for one of the scanning beam patterns for the beam scanning stage satisfies a predefined quality threshold; and
- selecting the one of the scanning beam patterns for the beam scanning stage for which the signal quality metric value of the known signal satisfies the predefined quality threshold as the preferred scanning beam pattern for the beam scanning stage.

15. The method of claim 12 wherein determining the preferred scanning beam pattern for each of the plurality of beam scanning stages comprises, for each beam scanning stage:
- observing non-overlapping radio resource slots used by the transmit node for transmission of a known signal using each of the plurality of scanning beam patterns for the beam scanning stage to thereby determine a quality metric value for the known signal for each of the plurality of scanning beam patterns for the beam scanning stage; and
- selecting one of the scanning beam patterns for the beam scanning stage based on the signal quality metric values of the known signal for the plurality of beam scanning patterns for the beam scanning stage as the preferred scanning beam pattern for the beam scanning stage.

16. The method of claim 15 wherein selecting the one of the scanning beam patterns as the preferred scanning beam pattern for the beam scanning stage comprises selecting the one of the scanning beam patterns for the beam scanning stage having the best signal quality metric.

17. The method of claim 15 wherein the non-overlapping radio resource slots comprise at least one of a group consisting of: non-overlapping time resources, non-overlapping frequency resources, and non-overlapping code resources.

18. A receive node enabled to provide feedback to assist in non-adaptive beam scanning by a transmit node to select a transmit beam pattern from a plurality of transmit beam patterns of the transmit node, comprising:
- a wireless transceiver comprising a transmitter and a receiver coupled to a plurality of antennas; and
- at least one processor configured to:
  - determine a preferred scanning beam pattern from a plurality of scanning beam patterns transmitted in a non-adaptive manner for each of a plurality of beam scanning stages such that the plurality of scanning beam patterns used to perform non-adaptive beam scanning are independent of feedback from the receive node during the non-adaptive beam scanning procedure and where the plurality of transmit beam patterns of the transmit node partition a service coverage area of the transmit node into a plurality of transmit partition cells; and
  - send, to the transmit node via the transmitter, an indication of the preferred scanning beam pattern for each of the plurality of beam scanning stages.

19. The receive node of claim 18 wherein the plurality of scanning beam patterns for the plurality of beam scanning stages are such that each unique combination of scanning beam patterns consisting of one scanning beam pattern from each of the plurality of beam scanning stages corresponds to a different transmit beam pattern of the plurality of transmit beam patterns of the transmit node.

20. The receive node of claim 18 wherein, in order to determine the preferred scanning beam pattern for each of the plurality of beam scanning stages, the at least one processor is further configured to, for each beam scanning stage:
- sequentially observe, via the receiver, non-overlapping radio resource slots used by the transmit node for transmission of a known signal using each of the plurality of scanning beam patterns for the beam scanning stage until a signal quality metric value for the known signal for one of the scanning beam patterns for the beam scanning stage satisfies a predefined quality threshold; and
- select the one of the scanning beam patterns for the beam scanning stage for which the signal quality metric value of the known signal satisfies the predefined quality metric as the preferred scanning beam pattern for the beam scanning stage.

21. The receive node of claim 18 wherein, in order to determine the preferred scanning beam pattern for each of the plurality of beam scanning stages, the at least one processor is further configured to, for each beam scanning stage:
- observe, via the receiver, non-overlapping radio resource slots used by the transmit node for transmission of a known signal using each of the plurality of scanning beam patterns for the beam scanning stage to thereby determine a quality metric value for the known signal for each of the plurality of scanning beam patterns for the beam scanning stage; and
- select one of the scanning beam patterns for the beam scanning stage based on the signal quality metric values of the known signal for the plurality of beam scanning patterns for the beam scanning stage as the preferred scanning beam pattern for the beam scanning stage.

22. The receive node of claim 21 wherein the one of the scanning beam patterns for the beam scanning stage selected as the preferred scanning beam pattern for the beam scanning stage is the beam scanning pattern for the beam scanning stage having the best signal quality metric.

23. The receive node of claim 21 wherein the non-overlapping radio resource slots comprise at least one of a group consisting of: non-overlapping time resources, non-overlapping frequency resources, and non-overlapping code resources.

24. A system enabling performance of non-adaptive beam scanning for a plurality of transmit beam patterns of a transmit node, comprising:
- the transmit node configured to:
  - transmit a known signal using each of a plurality of scanning beam patterns for each of a plurality of beam scanning stages over non-overlapping radio resource slots transmitted in a non-adaptive manner such that the plurality of scanning beam patterns used to perform non-adaptive beam scanning are independent of feedback from a receive node during the non-adaptive beam scanning procedure;
  - wherein the plurality of scanning beam patterns for the plurality of beam scanning stages are such that each unique combination of scanning beam patterns consisting of one scanning beam pattern from each of the plurality of beam scanning stages corresponds to a different transmit beam pattern of the plurality of transmit beam patterns of the transmit node that partition a service coverage area of the transmit node into a plurality of transmit partition cells; and the receive node configured to:
determine a preferred scanning beam pattern from the plurality of scanning beam patterns for each of the plurality of beam scanning stages based on the transmission of the known signal using the plurality of scanning beam patterns for each of the plurality of beam scanning stages.

25. The system of claim 24 wherein the receive node is further configured to send, to the transmit node, an indication of the preferred scanning beam pattern for each of the plurality of beam scanning stages.

26. The system of claim 24 wherein the receive node is further configured to:
select one of the plurality of transmit beam patterns for the transmit node that corresponds to a combination of the preferred scanning beam patterns for the plurality of beam scanning stages as a selected transmit beam pattern for transmission from the transmit node to the receive node; and
transmit an indication of the selected transmit beam pattern to the transmit node.

27. A method of operation of a receive node to provide feedback to assist in non-adaptive beam scanning and selection by a transmit node to select a transmit beam pattern from a plurality of transmit beam patterns of the transmit node, comprising:

determining a preferred scanning beam pattern from a plurality of scanning beam patterns transmitted in a non-adaptive manner for each of a plurality of beam scanning stages such that the plurality of scanning beam patterns used to perform non-adaptive beam scanning are independent of feedback from the receive node during the non-adaptive beam scanning procedure and where ther plurality of transmit beam patterns of the transmit node partition a service coverage area of the transmit node into a plurality of transmit partition cells, wherein the plurality of scanning beam patterns for the plurality of beam scanning stages are such that each unique combination of scanning beam patterns consisting of one scanning beam pattern from each of the plurality of beam scanning stages corresponds to a different transmit beam pattern of the plurality of transmit beam patterns of the transmit node;

selecting one of the plurality of transmit beam patterns for the transmit node that corresponds to a combination of the preferred scanning beam patterns for the plurality of beam scanning stages as a selected transmit beam pattern for transmission from the transmit node to the receive node; and transmitting an indication of the selected transmit beam pattern to the transmit node.

\* \* \* \* \*